US011129036B2

(12) United States Patent
Lu et al.

(10) Patent No.: US 11,129,036 B2
(45) Date of Patent: Sep. 21, 2021

(54) METHOD AND APPARATUS FOR ESTIMATING PATHLOSS OF PUSCH IN A WIRELESS COMMUNICATION SYSTEM

(71) Applicant: ASUSTek Computer Inc., Taipei (TW)

(72) Inventors: Chia-Chi Lu, Taipei (TW); Ko-Chiang Lin, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 16/527,856

(22) Filed: Jul. 31, 2019

(65) Prior Publication Data

US 2020/0053579 A1 Feb. 13, 2020

Related U.S. Application Data

(60) Provisional application No. 62/717,356, filed on Aug. 10, 2018.

(51) Int. Cl.
*H04W 24/08* (2009.01)
*H04W 52/16* (2009.01)
*H04W 52/14* (2009.01)
*H04W 52/24* (2009.01)

(52) U.S. Cl.
CPC ......... *H04W 24/08* (2013.01); *H04W 52/146* (2013.01); *H04W 52/16* (2013.01); *H04W 52/245* (2013.01)

(58) Field of Classification Search
None
See application file for complete search history.

(56) References Cited

U.S. PATENT DOCUMENTS 10,681,645 B2 * 6/2020 Kang ................. H04W 52/146
2012/0257513 A1 * 10/2012 Yamada .............. H04L 1/0618
370/248
2015/0271758 A1 9/2015 Park
(Continued)

FOREIGN PATENT DOCUMENTS

WO 2017168369 10/2017

OTHER PUBLICATIONS

Samsung: "Summary of NR UL power control -CA/DC aspects", 3GPP Draft; R1-1807660 7.1.6.2_Summary of NR UL PC-CA and DC Aspects, 3RD Generation Partnership Project (3GPP), Mobile Competence Centre ; 650, Route Des Lucioles ; F-06921 Sophia-Antipolis Cedex vol. RAN WG1, No. Busan, Korea; 20180521-20180525 May 24, 2018 (May 24, 2018), XP051463291.
(Continued)

*Primary Examiner* — Lonnie V Sweet
(74) *Attorney, Agent, or Firm* — Skaar Ulbrich Macari, P.A.

(57) ABSTRACT

Methods and apparatuses estimating pathloss of PUSCH in a wireless communication system are disclosed herein. In one method, the UE receives a first configuration of a first serving cell and a second serving cell, wherein the second serving cell is a pathloss reference for the first serving cell. The UE receives a second configuration of multiple downlink bandwidth parts of the second serving cell, wherein a downlink bandwidth part among the multiple downlink bandwidth parts is an active downlink bandwidth part. The UE estimates (or derives) a pathloss for an uplink transmission in an uplink bandwidth part of the first serving cell based on a reference signal in the downlink bandwidth part.

20 Claims, 10 Drawing Sheets

(56) References Cited

U.S. PATENT DOCUMENTS

| | | | | |
|---|---|---|---|---|
| 2018/0084550 | A1* | 3/2018 | Chen | H04W 76/15 |
| 2018/0288746 | A1* | 10/2018 | Zhang | H04L 1/0031 |
| 2018/0343089 | A1* | 11/2018 | Park | H04L 5/005 |
| 2019/0215777 | A1* | 7/2019 | Kang | H04L 5/0092 |
| 2020/0052802 | A1* | 2/2020 | Ryu | H04W 52/242 |
| 2020/0163023 | A1* | 5/2020 | Pelletier | H04W 72/042 |

OTHER PUBLICATIONS

Ericsson (Rapporteur): "Introduction of SA", 3GPP Draft; 38331 SA ASN1 Phase2 6 Protocol Data Units—6.3.1 System Information Blocks V23, 3RD Generation Partnership Project (3GPP), Mobile Competence Centre ; 650, Route Des Lucioles ; F-06921 SO No. Montreal, Canada; 20180702-20180706 Aug. 9, 2018 (Aug. 9, 2018), XP051471566.

Asustek: "Remaining issues on PUSCH power control", 3GPP Draft; R1-1809295 Remaining Issues on Pusch Power Control, 3rd Generation Partnership Project (3GPP), Mobile Competence Centre ; 650, Route Des Lucioles ; F-06921 Sophia-Antipolis Cedex ;France 9 vol. Ran WG1, No. Gothenburg, Sweden; 20180820-20180824 Aug. 9, 2018 (Aug. 10, 2018), XP051516659.

European Search Report in corresponding EP Application No. 19189387.4, dated Jan. 3, 2020.

Office Action from Taiwan Intellectual Property Office in corresponding CN Application No. 108127296, dated Feb. 27, 2020.

Keysight Technologies, "Understanding the 5G NR Physical Layer," Nov. 1, 2017. (URL :https://www.keysight.com/upload/cmc_upload/All/Understanding_the_5G_NR_Physical_Layer.pdf).

Office Action from Japan Patent Office in corresponding JP Application No. 2019-140601, dated Aug. 4, 2020.

ASUSTek, "Impact of pathloss reference on PHR triggering", 3GPP TSG RAN WG2#102, R2-1806917, 3GPP, May 11, 2018.

Vivo, "Discussion on PHR for beam", 3GPP TSG RAN WG2#102, R2-1807583, 3GPP, May 11, 2018.

Qualcomm Incorporated, "Remaining Issues on BWP", 3GPP TSG RAN WG1#92B, R1-1804809, 3GPP, Apr. 7, 2018.

Ericsson (Rapporteur), R2-1810388, Introduction of SA, 3GPP Email_Discussions RAN2, 3GPP server release date (Aug. 6, 2018) End.

Office Action from Korean Intellectual Property Office in corresponding KR Application No. 10-2019-0093247, dated Apr. 17, 2020.

Office Action to the corresponding Indian Patent Application rendered by Intellectual Property India on Oct. 21, 2020, 6 pages.

Office Action to the corresponding Taiwan Patent Application rendered by the Taiwan Intellectual Property Office (TIPO) on Oct. 30, 2020, 4 pages.

\* cited by examiner

| Row | Ports $X$ | Density $\rho$ | cdm-Type | $(\bar{k},\bar{l})$ | CDM group index $j$ | $k'$ | $l'$ |
|---|---|---|---|---|---|---|---|
| 1 | 1 | 3 | No CDM | $(k_0,l_0), (k_0+4,l_0), (k_0+8,l_0)$ | 0,0,0 | 0 | 0 |
| 2 | 1 | 1, 0.5 | No CDM | $(k_0,l_0)$, | 0 | 0 | 0 |
| 3 | 2 | 1, 0.5 | FD-CDM2 | $(k_0,l_0)$, | 0 | 0, 1 | 0 |
| 4 | 4 | 1 | FD-CDM2 | $(k_0,l_0), (k_0+2,l_0)$ | 0,1 | 0, 1 | 0 |
| 5 | 4 | 1 | FD-CDM2 | $(k_0,l_0), (k_0,l_0+1)$ | 0,1 | 0, 1 | 0 |
| 6 | 8 | 1 | FD-CDM2 | $(k_0,l_0), (k_1,l_0), (k_2,l_0), (k_3,l_0)$ | 0,1,2,3 | 0, 1 | 0 |
| 7 | 8 | 1 | FD-CDM2 | $(k_0,l_0), (k_1,l_0), (k_0,l_0+1), (k_1,l_0+1)$ | 0,1,2,3 | 0, 1 | 0 |
| 8 | 8 | 1 | CDM4 (FD2,TD2) | $(k_0,l_0), (k_1,l_0)$ | 0,1 | 0, 1 | 0, 1 |
| 9 | 12 | 1 | FD-CDM2 | $(k_0,l_0), (k_1,l_0), (k_2,l_0), (k_3,l_0), (k_4,l_0), (k_5,l_0)$ | 0,1,2,3,4,5 | 0, 1 | 0 |
| 10 | 12 | 1 | CDM4 (FD2,TD2) | $(k_0,l_0), (k_1,l_0), (k_2,l_0)$ | 0,1,2 | 0, 1 | 0, 1 |
| 11 | 16 | 1, 0.5 | FD-CDM2 | $(k_0,l_0), (k_1,l_0), (k_2,l_0), (k_3,l_0), (k_0,l_0+1), (k_1,l_0+1), (k_2,l_0+1), (k_3,l_0+1)$ | 0,1,2,3,4,5,6,7 | 0, 1 | 0 |
| 12 | 16 | 1, 0.5 | CDM4 (FD2,TD2) | $(k_0,l_0), (k_1,l_0), (k_2,l_0), (k_3,l_0)$ | 0,1,2,3 | 0, 1 | 0, 1 |
| 13 | 24 | 1, 0.5 | FD-CDM2 | $(k_0,l_0), (k_1,l_0), (k_2,l_0), (k_0,l_0+1), (k_1,l_0+1), (k_2,l_0+1), (k_0,l_1), (k_1,l_1), (k_2,l_1), (k_0,l_1+1), (k_1,l_1+1), (k_2,l_1+1)$ | 0,1,2,3,4,5, 6,7,8,9,10,11 | 0, 1 | 0 |
| 14 | 24 | 1, 0.5 | CDM4 (FD2,TD2) | $(k_0,l_0), (k_1,l_0), (k_2,l_0), (k_0,l_1), (k_1,l_1), (k_2,l_1)$ | 0,1,2,3,4,5 | 0, 1 | 0, 1 |
| 15 | 24 | 1, 0.5 | CDM8 (FD2,TD4) | $(k_0,l_0), (k_1,l_0), (k_2,l_0)$ | 0,1,2 | 0, 1 | 0, 1, 2, 3 |
| 16 | 32 | 1, 0.5 | FD-CDM2 | $(k_0,l_0), (k_1,l_0), (k_2,l_0), (k_3,l_0),(k_0,l_0+1), (k_1,l_0+1), (k_2,l_0+1), (k_3,l_0+1), (k_0,l_1), (k_1,l_1), (k_2,l_1), (k_3,l_1), (k_0,l_1+1), (k_1,l_1+1), (k_2,l_1+1), (k_3,l_1+1)$ | 0,1,2,3, 4,5,6,7, 8,9,10,11, 12,13,14,15 | 0, 1 | 0 |
| 17 | 32 | 1, 0.5 | CDM4 (FD2,TD2) | $(k_0,l_0), (k_1,l_0), (k_2,l_0), (k_3,l_0), (k_0,l_1), (k_1,l_1), (k_2,l_1), (k_3,l_1)$ | 0,1,2,3,4,5,6,7 | 0, 1 | 0, 1 |
| 18 | 32 | 1, 0.5 | CDM8 (FD2,TD4) | $(k_0,l_0), (k_1,l_0), (k_2,l_0), (k_3,l_0)$ | 0,1,2,3 | 0,1 | 0,1, 2, 3 |

FIG. 5

| Index | $w_f(k')$ | $w_t(l')$ |
|---|---|---|
| 0 | 1 | 1 |

FIG. 6

| Index | $w_f(k')$ | $w_t(l')$ |
|---|---|---|
| 0 | [+1  +1] | 1 |
| 1 | [+1  −1] | 1 |

FIG. 7

| Index | $w_f(k')$ | $w_t(l')$ |
|---|---|---|
| 0 | [+1  +1] | [+1  +1] |
| 1 | [+1  −1] | [+1  +1] |
| 2 | [+1  +1] | [+1  −1] |
| 3 | [+1  −1] | [+1  −1] |

FIG. 8

| Index | $w_f(k')$ | $w_t(l')$ |
|---|---|---|
| 0 | $[+1\ +1]$ | $[+1\ +1\ +1\ +1]$ |
| 1 | $[+1\ -1]$ | $[+1\ +1\ +1\ +1]$ |
| 2 | $[+1\ +1]$ | $[+1\ -1\ +1\ -1]$ |
| 3 | $[+1\ -1]$ | $[+1\ -1\ +1\ -1]$ |
| 4 | $[+1\ +1]$ | $[+1\ +1\ -1\ -1]$ |
| 5 | $[+1\ -1]$ | $[+1\ +1\ -1\ -1]$ |
| 6 | $[+1\ +1]$ | $[+1\ -1\ -1\ +1]$ |
| 7 | $[+1\ -1]$ | $[+1\ -1\ -1\ +1]$ |

FIG. 9

| Channel or signal | OFDM symbol number $l$ relative to the start of an SS/PBCH block | Subcarrier number $k$ relative to the start of an SS/PBCH block |
|---|---|---|
| PSS | 0 | 56, 57, ..., 182 |
| SSS | 2 | 56, 57, ..., 182 |
| Set to 0 | 0 | 0, 1, ..., 55, 183, 184, ..., 239 |
|  | 2 | 48, 49, ..., 55, 183, 184, ..., 191 |
| PBCH | 1, 3 | 0, 1, ..., 239 |
|  | 2 | 0, 1, ..., 47, <br> 192, 193, ..., 239 |
| DM-RS for PBCH | 1, 3 | $0+v, 4+v, 8+v, ..., 236+v$ |
|  | 2 | $0+v, 4+v, 8+v, ..., 44+v$ <br> $192+v, 196+v, ..., 236+v$ |

FIG. 10

METHOD AND APPARATUS FOR ESTIMATING PATHLOSS OF PUSCH IN A WIRELESS COMMUNICATION SYSTEM

CROSS-REFERENCE TO RELATED APPLICATIONS

The present application claims the benefit of U.S. Provisional Patent Application Ser. No. 62/717,356 filed on Aug. 10, 2018, the entire disclosure of which is incorporated herein in its entirety by reference.

FIELD

This disclosure generally relates to wireless communication networks, and more particularly, to a method and apparatus for estimating pathloss of PUSCH in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

Methods and apparatuses for estimating pathloss of PUSCH in a wireless communication system are disclosed herein. In one method, the UE receives a first configuration of a first serving cell and a second serving cell, wherein the second serving cell is a pathloss reference for the first serving cell. The UE receives a second configuration of multiple downlink bandwidth parts of the second serving cell, wherein a downlink bandwidth part among the multiple downlink bandwidth parts is an active downlink bandwidth part. The UE estimates (or derives) a pathloss for an uplink transmission in an uplink bandwidth part of the first serving cell based on a reference signal in the downlink bandwidth part.

BRIEF DESCRIPTION OF THE DRAWINGS

FIG. 5 is a reproduction of Table 7.4.1.5.3-1 taken from 3GPP TS 38.211 V15.2.0 (2018-6).

FIG. 6 is a reproduction of Table 7.4.1.5.3-2 taken from 3GPP TS 38.211 V15.2.0 (2018-6).

FIG. 7 is a reproduction of Table 7.4.1.5.3-3 taken from 3GPP TS 38.211 V15.2.0 (2018-6).

FIG. 8 is a reproduction of Table 7.4.1.5.3-4 taken from 3GPP TS 38.211 V15.2.0 (2018-6).

FIG. 9 is a reproduction of Table 7.4.1.5.3-5 taken from 3GPP TS 38.211 V15.2.0 (2018-6).

FIG. 10 is a reproduction of Table 7.4.3.1-1 taken from 3GPP TS 38.211 V15.2.0 (2018-6).

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio) wireless access for 5G, or some other modulation techniques.

In particular, the exemplary wireless communication systems devices described below may be designed to support one or more standards such as the standard offered by a consortium named "3rd Generation Partnership Project" referred to herein as 3GPP, including: TS 38.213 V15.2.0 (2018-6), "NR; Physical layer procedures for control (Release 15)"; TS 38.331 V15.2.1 (2018-6), "NR; Radio Resource Control (RRC) protocol specification (Release 15)"; TS 38.211 V15.2.0 (2018-6), "NR; Physical channels and modulation"; and TS 38.321 V15.2.0 (2018-6), "NR; Medium Access Control (MAC) protocol specification. The standards and documents listed above are hereby expressly incorporated by reference in their entirety.

Figure 1:
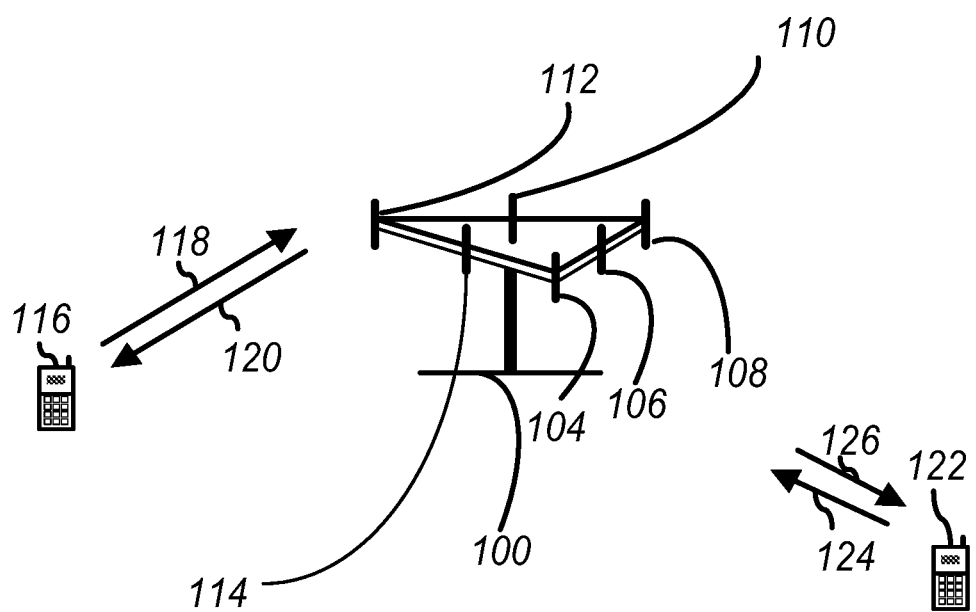
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), a network node, a network, or some other terminology. An access terminal (AT) may also be called user equipment (UE), a wireless communication device, terminal, access terminal or some other terminology.

Figure 2:
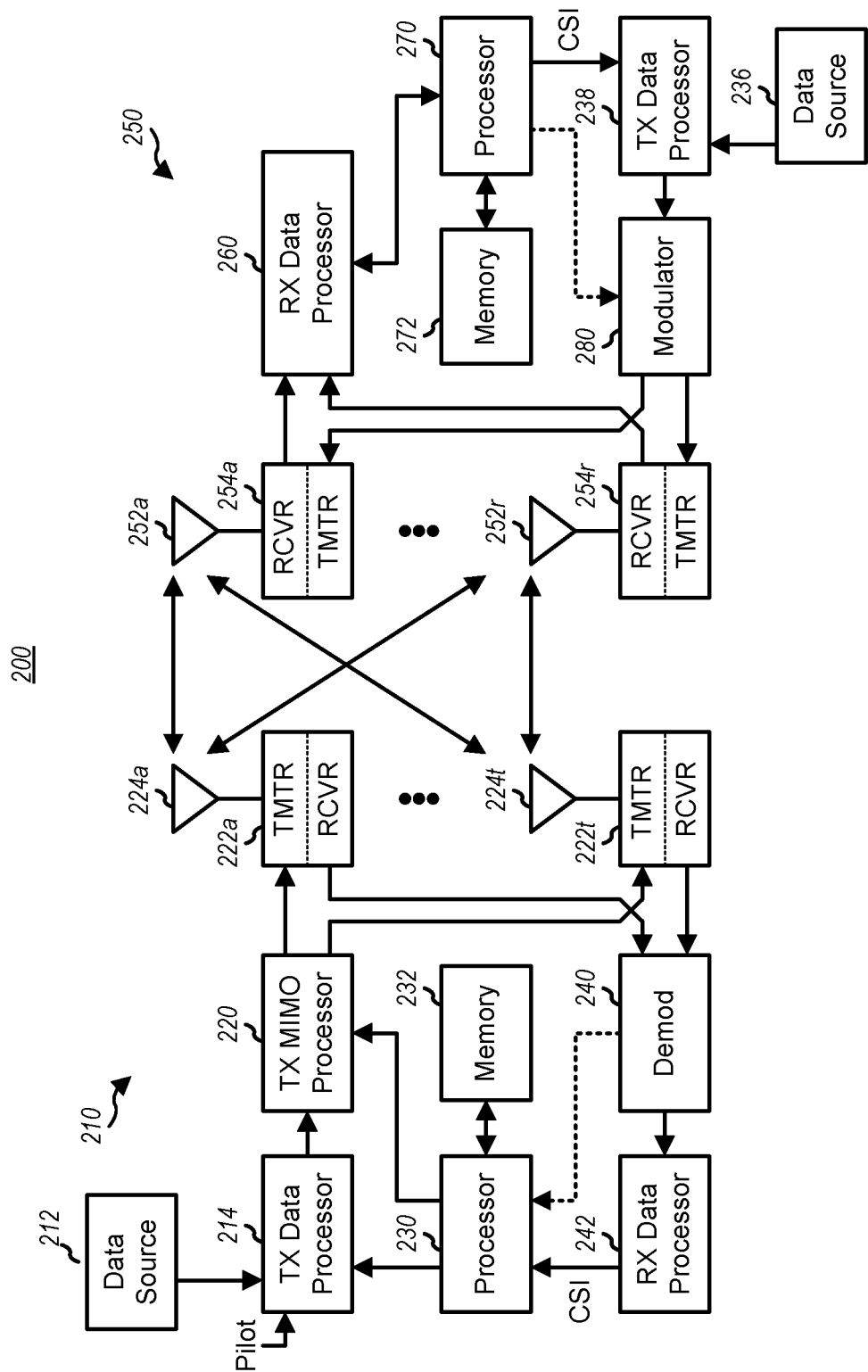
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and down converts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
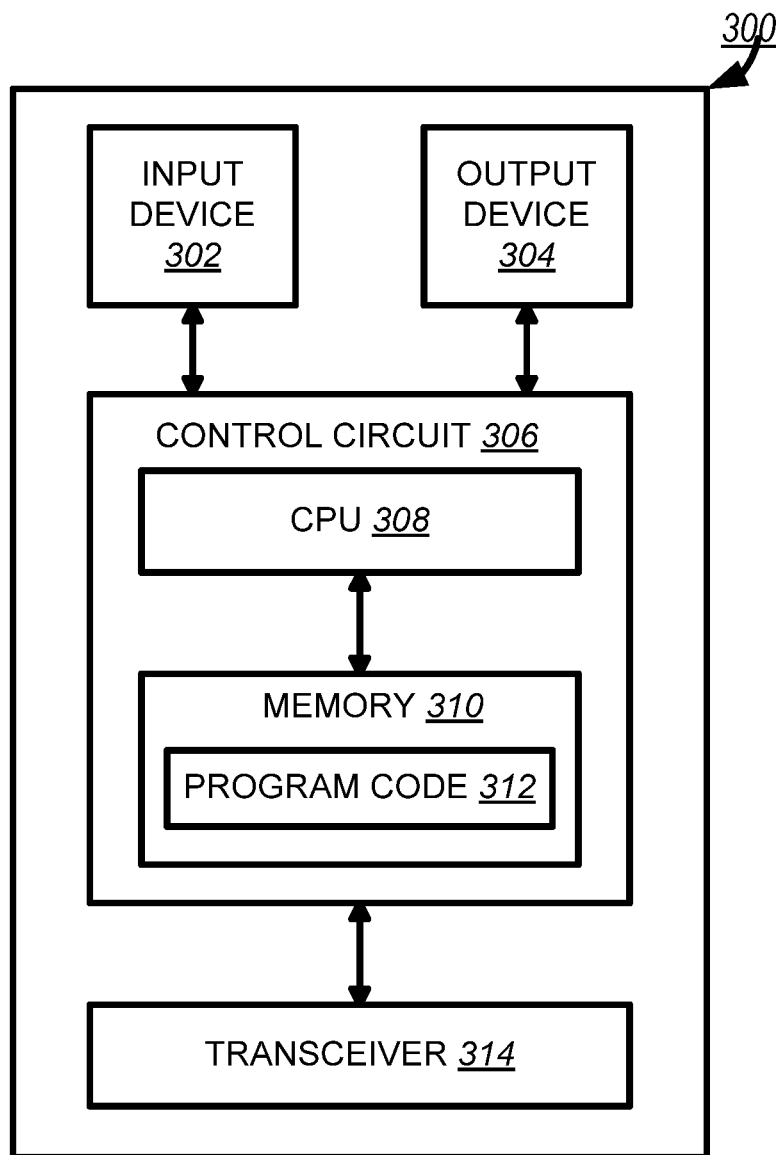
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system or the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
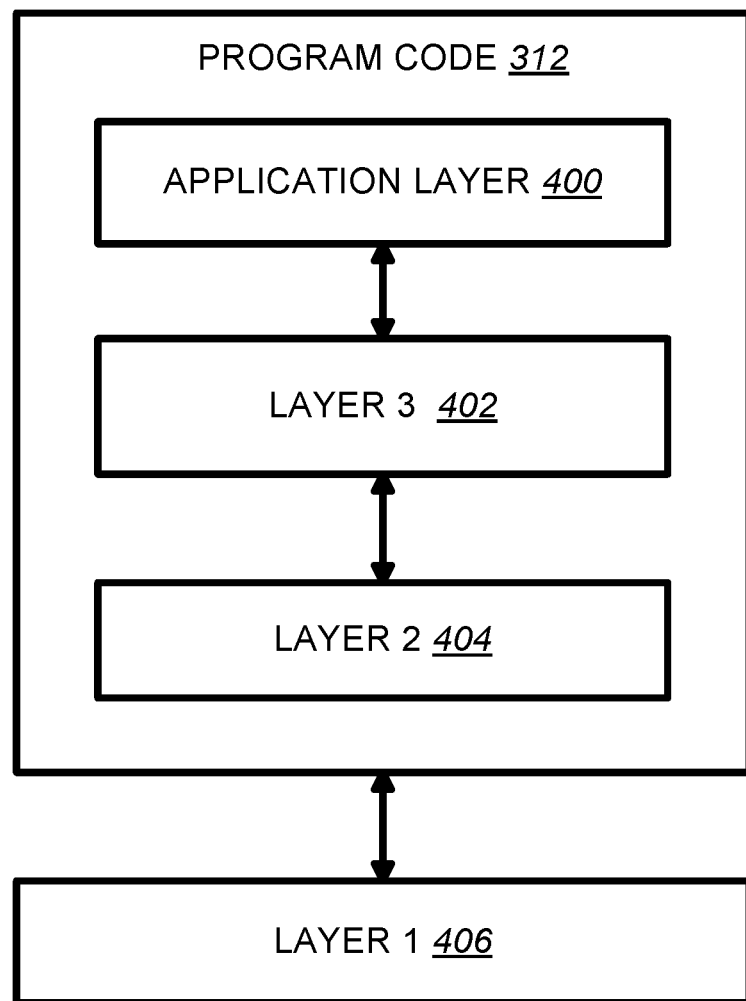
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

In 3GPP TS 38.213 V15.2.0 (2018-6), some descriptions related to power control of Physical Uplink Shared Channel (PUSCH) and the description of the Bandwidth Part (BWP) in TS 38.213 is quoted below:

7 Uplink Power control

Uplink power control determines the transmit power of the different uplink physical channels or signals.

A PUSCH/PUCCH/SRS/PRACH transmission occasion $i$ is defined by a slot index $n_{s,f}^{\mu}$ within a frame with system frame number SFN, a first symbol $S$ within the slot, and a number of consecutive symbols $L$.

7.1 Physical uplink shared channel

For PUSCH, a UE first scales a linear value $\hat{P}_{\text{PUSCH},b,f,c}(i,j,q_d,l)$ of the transmit power $P_{\text{PUSCH},b,f,c}(i,j,q_d,l)$ on UL BWP $b$, as described in Subclause 12, of carrier $f$ of serving cell $c$, with parameters as defined in Subclause 7.1.1, by the ratio of the number of antenna ports with a non-zero PUSCH transmission to the number of configured antenna ports for the transmission scheme. The resulting scaled power is then split equally across the antenna ports on which the non-zero PUSCH is transmitted. The UL BWP $b$ is the active UL BWP.

7.1.1 UE behaviour

If a UE transmits a PUSCH on UL BWP $b$ of carrier $f$ of serving cell $c$ using parameter set configuration with index $j$ and PUSCH power control adjustment state with index $l$, the UE determines the PUSCH transmission power $P_{\text{PUSCH},b,f,c}(i,j,q_d,l)$ in PUSCH transmission occasion $i$ as $$P_{\text{PUSCH},b,f,c}(i,j,q_d,l) = \min \begin{cases} P_{\text{CMAX},f,c}(i), \\ P_{\text{O\_PUSCH},b,f,c}(j) + 10\log_{10}(2^\mu \cdot M_{\text{RB},b,f,c}^{\text{PUSCH}}(i)) + \alpha_{b,f,c}(j) \cdot PL_{b,f,c}(q_d) + \Delta_{\text{TF},b,f,c}(i) + f_{b,f,c}(i,l) \end{cases}$$

[dBm]

where,

- $P_{\text{CMAX},f,c}(i)$ is the configured UE transmit power defined in [8-1, TS 38.101-1] and [8-2, TS38.101-2] for carrier $f$ of serving cell $c$ in PUSCH transmission occasion $i$.

- $P_{\text{O\_PUSCH},b,f,c}(j)$ is a parameter composed of the sum of a component $P_{\text{O\_NOMINAL\_PUSCH},f,c}(j)$ and a component $P_{\text{O\_UE\_PUSCH},b,f,c}(j)$ where $j \in \{0,1,...,J-1\}$.

- If a UE is not provided with higher layer parameter *P0-PUSCH-AlphaSet* or for a Msg3 PUSCH transmission as described in Subclause 8.3, $j=0$, $P_{\text{O\_UE\_PUSCH},f,c}(0) = 0$, and $P_{\text{O\_NOMINAL\_PUSCH},f,c}(0) = P_{\text{O\_PRE}} + \Delta_{PREAMBLE\_Msg3}$, where the parameter *preambleReceivedTargetPower* [11, TS 38.321] (for $P_{\text{O\_PRE}}$) and *msg3-DeltaPreamble* (for $\Delta_{PREAMBLE\_Msg3}$) are provided by higher layers for carrier $f$ of serving cell $c$.

- For a PUSCH (re)transmission configured by higher layer parameter *ConfiguredGrantConfig*, $j=1$, $P_{\text{O\_NOMINAL\_PUSCH},f,c}(1)$ is provided by higher layer parameter *p0-NominalWithoutGrant*, and $P_{\text{O\_UE\_PUSCH},b,f,c}(1)$ is provided by higher layer parameter *p0* obtained from *p0-PUSCH-Alpha* in *ConfiguredGrantConfig* that provides an index *P0-PUSCH-AlphaSetId* to a set of higher layer parameters *P0-PUSCH-AlphaSet* for UL BWP $b$ of carrier $f$ of serving cell $c$.

- For $j \in \{2,...,J-1\} = S_J$, a $P_{\text{O\_NOMINAL\_PUSCH},f,c}(j)$ value, applicable for all $j \in S_J$, is provided by higher layer parameter *p0-NominalWithGrant* for each carrier $f$ of serving cell $c$ and a set of $P_{\text{O\_UE\_PUSCH},b,f,c}(j)$ values are provided by a set of higher layer parameters *p0* in *P0-PUSCH-AlphaSet* indicated by a respective set of higher layer parameters *p0-PUSCH-AlphaSetId* for UL BWP $b$ of carrier $f$ of serving cell $c$.

- If the UE is provided by higher layer parameter *SRI-PUSCH-PowerControl* more than one values of *p0-PUSCH-AlphaSetId* and if DCI format 0_1 includes a SRI field, the UE obtains a mapping from higher layer parameter *sri-PUSCH-PowerControlId* in *SRI-PUSCH-PowerControl* between a set of values for the SRI field in DCI format 0_1 [5, TS 38.212] and a set of indexes provided by higher layer parameter *p0-PUSCH-AlphaSetId* that map to a set of *P0-PUSCH-AlphaSet* values. If the PUSCH transmission is scheduled by a DCI format 0_1, the UE determines the values of $P_{O\_UE\_PUSCH,b,f,c}(j)$ from the *p0alphasetindex* value that is mapped to the SRI field value.

- If the PUSCH transmission is scheduled by a DCI format 0_0 or by a DCI format 0_1 that does not include a SRI field, or if a higher layer parameter *SRI-P0AlphaSetIndex-Mapping* is not provided to the UE, $j = 2$, and the UE determines $P_{O\_UE\_PUSCH,b,f,c}(j)$ from the first *p0-pusch-alpha-set* in *p0-pusch-alpha-setconfig*.

- For $\alpha_{b,f,c}(j)$

- For $j = 0$, $\alpha_{b,f,c}(0)$ is a value of higher layer parameter *msg3-Alpha*, when provided; otherwise, $\alpha_{b,f,c}(0) = 1$.

- For $j = 1$, $\alpha_{b,f,c}(1)$ is provided by higher layer parameter *alpha* obtained from *p0-PUSCH-Alpha* in *ConfiguredGrantConfig* providing an index *P0-PUSCH-AlphaSetId* to a set of higher layer parameters *P0-PUSCH-AlphaSet* for UL BWP $b$ of carrier $f$ of serving cell $c$.

- For $j \in S_J$, a set of $\alpha_{b,f,c}(j)$ values are provided by a set of higher layer parameters *alpha* in *P0-PUSCH-AlphaSet* indicated by a respective set of higher layer parameters *p0-PUSCH-AlphaSetId* for UL BWP $b$ of carrier $f$ of serving cell $c$.

- If the UE is provided a higher layer parameter *SRI-PUSCH-PowerControl* and more than one values of *p0-PUSCH-AlphaSetId*, DCI format 0_1 includes a SRI field and the UE obtains a mapping from higher layer parameter *sri-PUSCH-PowerControlId* in *SRI-PUSCH-PowerControl* between a set of values for the SRI field in DCI format 0_1 [5, TS 38.212] and a set of indexes provided by higher layer parameter *p0-PUSCH-AlphaSetId* that map to a set of *P0-PUSCH-AlphaSet* values. If the PUSCH transmission is scheduled by a DCI format 0_1, the UE determines the values of $\alpha_{b,f,c}(j)$ from the *p0alphasetindex* value that is mapped to the SRI field value.

- If the PUSCH transmission is scheduled by a DCI format 0_0 or by a DCI format 0_1 that does not include a SRI field, or if a higher layer parameter *SRI-P0AlphaSetIndex-Mapping* is not provided to the UE, $j = 2$, and the UE determines $\alpha_{b,f,c}(j)$ from the first *p0-pusch-alpha-set* in *p0-pusch-alpha-setconfig*.

- $M^{PUSCH}_{RB,b,f,c}(i)$ is the bandwidth of the PUSCH resource assignment expressed in number of resource blocks for PUSCH transmission occasion $i$ on UL BWP $b$ of carrier $f$ of serving cell $c$ and $\mu$ is defined in [4, TS 38.211].

- $PL_{b,f,c}(q_d)$ is a downlink path-loss estimate in dB calculated by the UE using reference signal (RS) index $q_d$ for a DL BWP that is linked with UL BWP $b$ of carrier $f$ of serving cell $c$.

- If the UE is not provided higher layer parameter *PUSCH-PathlossReferenceRS* and before the UE is provided dedicated higher layer parameters, the UE calculates $PL_{b,f,c}(q_d)$ using a RS resourcefrom the SS/PBCH block index that the UE obtains higher layer parameter *MasterInformationBlock*.

- If the UE is configured with a number of RS resource indexes up to the value of higher layer parameter *maxNrofPUSCH-PathlossReferenceRSs* and a respective set of RS configurations for the number of RS resource indexes by higher layer parameter *PUSCH-PathlossReferenceRS*. The set of RS resource indexes can include one or both of a set of SS/PBCH block indexes, each provided by higher layer parameter *ssb-Index* when a value of a corresponding higher layer parameter pusch-*PathlossReferenceRS-Id* maps to a SS/PBCH block index, and a set of CSI-RS resource indexes, each provided by higher layer parameter *csi-RS-Index* when a value of a corresponding higher layer parameter *pusch-PathlossReferenceRS-Id* maps to a CSI-RS resource index. The UE identifies a RS resource index in the set of RS resource indexes to correspond either to a SS/PBCH block index or to a CSI-RS resource index as provided by higher layer parameter *pusch-PathlossReferenceRS-Id* in *PUSCH-PathlossReferenceRS*.

- If the PUSCH is an Msg3 PUSCH, the UE uses the same RS resource index as for a corresponding PRACH transmission.

- If the UE is provided a higher layer parameter *SRI-PUSCH-PowerControl* and more than one values of *PUSCH-PathlossReferenceRS-Id*, the UE obtains a mapping from higher layer parameter *sri-PUSCH-PowerControlId* in *SRI-PUSCH-PowerControl* between a set of values for the SRI field in DCI format 0_1 and a set of *PUSCH-PathlossReferenceRS-Id* values. If the PUSCH transmission is scheduled by a DCI format 0_1, DCI format 0_1 includes a SRI field and the UE determines the RS resource $q_d$ from the value of *pusch-pathlossreference-index* that is mapped to the SRI field value.

- If the PUSCH transmission is in response to a DCI format 0_0 detection, and if the UE is provided a spatial setting by higher layer parameter *PUCCH-Spatialrelationinfo* for a PUCCH resource with a lowest index for UL BWP $b$ of each carrier $f$ and serving cell $c$ , as described in Subclause 9.2.2, the UE uses the same RS resource index as for a PUCCH transmission.

- If the PUSCH transmission is scheduled by a DCI format 0_0 and if the UE is not provided a spatial setting for a PUCCH transmission, or by a DCI format 0_1 that does not include a SRI field, or if a higher layer parameter *SRI-PathlossReferenceIndex-Mapping* is not provided to the UE, the UE determines a RS resource with a respective higher layer parameter *pusch-pathlossreference-index* value being equal to zero.

- For a PUSCH transmission configured by higher layer parameter *ConfiguredGrantConfig*, if higher layer parameter *rrc-ConfiguredUplinkGrant* is included in *ConfiguredGrantConfig* , a RS resource index $q_d$ is provided by a value of higher layer parameter *pathlossReferenceIndex* included in *rrc-ConfiguredUplinkGrant*.

- For a PUSCH transmission configured by higher layer parameter *ConfiguredGrantConfig* is not included in *ConfiguredGrantConfig* does not include higher layer parameter *pathlossReferenceIndex*, the UE determines the RS resource $q_d$ from the value of *PUSCH-PathlossReferenceRS-Id* that is mapped to the SRI field value in the DCI format activating the PUSCH transmission. If the DCI format activating the PUSCH transmission does not include a SRI field, the UE determines a RS resource with a respective higher layer parameter *PUSCH-PathlossReferenceRS-Id* value being equal to zero.

$PL_{b,f,c}(q_d)$ $PL_{f,c}(q_d)$ = *referenceSignalPower* – higher layer filtered RSRP, where *referenceSignalPower* is provided by higher layers and RSRP is defined in [7, TS 38.215] for the reference serving cell and the higher layer filter configuration is defined in [12, TS 38.331] for the reference serving cell.

For $j = 0$ , *referenceSignalPower* is provided by higher layer parameter *ss-PBCH-BlockPower*. For $j > 0$ , *referenceSignalPower* is configured by either higher layer parameter *ss-PBCH-BlockPower* or, when periodic CSI-RS transmission is configured, by higher layer parameter *powerControlOffsetSS* providing an offset of the CSI-RS transmission power relative to the SS/PBCH block transmission power [6, TS 38.214].

- $\Delta_{TF,b,f,c}(i) = 10\log_{10}\left(\left(2^{BPRE \cdot K_s} - 1\right) \cdot \beta_{offset}^{PUSCH}\right)$ for $K_S = 1.25$ and $\Delta_{TF,b,f,c}(i) = 0$ for $K_S = 0$ where $K_S$ is provided by higher layer parameter *deltaMCS* provided for each UL BWP $b$ of each carrier $f$ and serving cell $c$. If the PUSCH transmission is over more than one layer [6, TS 38.214], $\Delta_{TF,b,f,c}(i) = 0$. BPRE and $\beta_{offset}^{PUSCH}$, for each UL BWP $b$ of each carrier $f$ and each serving cell $c$, are computed as below.

- $BPRE = \sum_{r=0}^{C-1} K_r / N_{RE}$ for PUSCH with UL-SCH data and $BPRE = O_{CSI} / N_{RE}$ for CSI transmission in a PUSCH without UL-SCH data, where

- $C$ is the number of code blocks, $K_r$ is the size for code block $r$, $O_{CSI}$ is the number of CSI part 1 bits including CRC bits, and $N_{RE}$ is the number of resource elements determined as $N_{RE} = M_{RB,b,f,c}^{PUSCH}(i) \cdot \sum_{j=0}^{N_{symb,b,f,c}^{PUSCH}(i)-1} N_{sc,data}^{RB}(i,j)$, where $N_{symb,b,f,c}^{PUSCH}(i)$ is the number of symbols for PUSCH transmission occasion $i$ on UL BWP $b$ of carrier $f$ of serving cell $c$, $N_{sc,data}^{RB}(i,j)$ is a number of subcarriers excluding DM-RS subcarriers in PUSCH symbol $j$, $0 \le j < N_{symb,b,f,c}^{PUSCH}(i)$, and $C$, $K_r$ are defined in [5, TS 38.212].

- $\beta_{offset}^{PUSCH} = 1$ when the PUSCH includes UL-SCH data and $\beta_{offset}^{PUSCH} = \beta_{offset}^{CSI,1}$, as described in Subclause 9.3, when the PUSCH includes CSI and does not include UL-SCH data.

- For the PUSCH power control adjustment state for UL BWP $b$ of carrier $f$ of serving cell $c$ in PUSCH transmission occasion $i$

- $\delta_{PUSCH,b,f,c}(i_{last}, i, K_{PUSCH}, l)$ is a correction value, also referred to as a TPC command, and is included in a DCI format 0_0 or DCI format 0_1 that schedules the PUSCH transmission occasion $i$, after a last PUSCH transmission occasion $i_{last}$, on UL BWP $b$ of carrier $f$ of serving cell $c$ or jointly coded with other TPC commands in a DCI format 2_2 having CRC parity bits scrambled by TPC-PUSCH-RNTI, as described in Subclause 11.3;

- $l \in \{0,1\}$ if the UE is configured with higher layer parameter *twoPUSCH-PC-AdjustmentStates*, and $l = 0$ if the UE is not configured with higher layer parameter *twoPUSCH-PC-AdjustmentStates* or if the PUSCH is a Msg3 PUSCH.

- For a PUSCH (re)transmission configured by higher layer parameter *ConfiguredGrantConfig*, the value of $l \in \{0,1\}$ is provided to the UE by higher layer parameter *powerControlLoopToUse*

- If the UE is provided a higher layer parameter *SRI-PUSCH-PowerControl*, the UE obtains a mapping between a set of values for the SRI field in DCI format 0_1 and the $l$ value(s) provided by higher layer parameter *sri-PUSCH-ClosedLoopIndex*. If the PUSCH transmission is scheduled by a DCI format 0_1 and if DCI format 0_1 includes a SRI field, the UE determines the $l$ value that is mapped to the SRI field value

- If the PUSCH transmission is scheduled by a DCI format 0_0 or by a DCI format 0_1 that does not include a SRI field, or if a higher layer parameter *SRI-PUSCH-PowerControl* is not provided to the UE, $l = 0$

- $\delta_{\text{PUSCH},b,f,c}(i_{\text{last}}, i, K_{\text{PUSCH}}, l) = 0$ dB if the UE does not detect, after a last PUSCH transmission occasion $i_{\text{last}}$, a DCI format providing a TPC command for PUSCH transmissions on UL BWP $b$ of carrier $f$ of serving cell $c$.

- If the PUSCH transmission is in response to a PDCCH decoding with DCI format 0_0 or DCI format 0_1, or the TPC command is provided by DCI format 2_2 having CRC parity bits scrambled by TPC-PUSCH-RNTI, the respective $\delta_{\text{PUSCH},b,f,c}$ accumulated values are given in Table 7.1.1-1.

- If the PUSCH transmission is in response to a detection by the UE of a DCI format 0_0 or DCI format 0_1, $K_{\text{PUSCH}}$ is a number of symbols for UL BWP $b$ of carrier $f$ of serving cell $c$ after a last symbol of a corresponding PDCCH and before a first symbol of the PUSCH transmission

- If the PUSCH transmission is configured by higher layer parameter *ConfiguredGrantConfig*, $K_{\text{PUSCH}}$ is a number of $K_{\text{PUSCH,min}}$ symbols equal to the product of a number of symbols per slot, $N_{\text{symb}}^{\text{slot}}$, and the minimum of the values provided by higher layer parameter *k2* and for UL BWP $b$ of carrier $f$ of serving cell $c$

- If accumulation of TPC commands is enabled by higher layer parameter *tpc-Accumulation*, for accumulation of a TPC commands that the UE receives by DCI formats 2_2 with CRC scrambled by a TPC-PUSCH-RNTI between a PUSCH transmission occasion $i_{\text{last}}$ and a PUSCH transmission occasion $i$, $$\delta_{\text{PUSCH},b,f,c}(i_{\text{last}},i,K_{\text{PUSCH}},l) = \delta_{\text{PUSCH},b,f,c}(i_{\text{last}},i,K_{\text{PUSCH}},l) + \sum_{m=0}^{M-1} \delta_{\text{PUSCH},b,f,c}(i_{\text{last}},i,K_{\text{PUSCH}}(m),l)$$

where

- $i_{\text{last}}$ is a PUSCH transmission occasion immediately prior to PUSCH transmission occasion $i$

- if the PUSCH transmission occasions $i$ and $i_{\text{last}}$ on UL BWP $b$ of carrier $f$ of serving cell $c$ are in response to detection by the UE of DCI format(s) 0_0 or DCI format(s) 0_1, $M$ is a number of DCI formats 2_2 with CRC scrambled by a TPC-PUSCH-RNTI that the UE receives corresponding PDCCHs

- after a last symbol of a corresponding PDCCH for PUSCH transmission occasion $i_{\text{last}}$, and

- before a last symbol of a corresponding PDCCH for PUSCH transmission occasion $i$

- if the PUSCH transmission occasion $i$ on UL BWP $b$ of carrier $f$ of serving cell $c$ is in response to detection by the UE of DCI format 0_0 or DCI format 0_1 and the PUSCH transmission occasion $i_{\text{last}}$ on UL BWP $b$ of carrier $f$ of serving cell $c$ is configured by higher layer parameter *ConfiguredGrantConfig*, $M$ is a number of DCI formats 2_2 with CRC scrambled by a TPC-PUSCH-RNTI that the UE receives corresponding PDCCHs

- after a number of $K_{\text{PUSCH,min}}$ symbols before a first symbol for PUSCH transmission at occasion $i_{\text{last}}$, where $K_{\text{PUSCH,min}}$ is equal to the product of a number of symbols per slot, $N_{\text{symb}}^{\text{slot}}$, and the minimum of the values provided by higher layer parameter *k2* and for UL BWP $b$ of carrier $f$ of serving cell $c$, and

- before a last symbol of a corresponding PDCCH for PUSCH transmission occasion $i$

- if the PUSCH transmission occasion $i$ on UL BWP $b$ of carrier $f$ of serving cell $c$ is configured by higher layer parameter *ConfiguredGrantConfig* and the PUSCH transmission occasion $i_{\text{last}}$ on UL BWP $b$ of carrier $f$ of serving cell $c$ is in response to detection by the UE of DCI format 0_0 or DCI format 0_1, $M$ is a number of DCI formats 2_2 with CRC scrambled by a TPC-PUSCH-RNTI that the UE receives corresponding PDCCHs

- after a last symbol of a corresponding PDCCH for PUSCH transmission occasion $i_{\text{last}}$, and

- at or before a number of $K_{\text{PUSCH,min}}$ symbols before a first symbol for PUSCH transmission occasion $i$

- if the PUSCH transmission occasions $i$ and $i_{\text{last}}$ on UL BWP $b$ of carrier $f$ of serving cell $c$ are configured by higher layer parameter *ConfiguredGrantConfig*, $M$ is a number of DCI formats 2_2 with CRC scrambled by a TPC-PUSCH-RNTI that the UE receives corresponding PDCCHs

- after a number of $K_{\text{PUSCH,min}}$ symbols before a first symbol for PUSCH transmission occasion $i_{\text{last}}$, and

- at or before a number of $K_{\text{PUSCH,min}}$ symbols before a first symbol for PUSCH transmission occasion $i$

- $f_{b,f,c}(i,l) = f_{b,f,c}(i_{\text{last}},l) + \delta_{\text{PUSCH},b,f,c}(i_{\text{last}},i,K_{\text{PUSCH}},l)$ is the PUSCH power control adjustment state for UL BWP $b$ of carrier $f$ of serving cell $c$ and PUSCH transmission occasion $i$ if accumulation is enabled based on higher layer parameter *tpc-Accumulation*, where

- If the UE has reached $P_{\text{CMAX},f,c}(i)$ for UL BWP $b$ of carrier $f$ of serving cell $c$, the UE does not accumulate positive TPC commands for UL BWP $b$ of carrier $f$ of serving cell $c$.

- If UE has reached minimum power, $P_{\text{CMIN},f,c}(i)$, for UL BWP $b$ of carrier $f$ of serving cell $c$, the UE does not accumulate negative TPC commands for UL BWP $b$ of carrier $f$ of serving cell $c$.

- A UE resets accumulation for UL BWP $b$ of carrier $f$ of serving cell $c$

- When $P_{\text{O\_UE\_PUSCH},b,f,c}(j)$ value is provided by higher layers;

- When $P_{\text{O\_UE\_PUSCH},b,f,c}(j)$ value is provided by higher layers and serving cell $c$ is a secondary cell;

- When $\alpha_{f,b,c}(j)$ value is provided by higher layers;

- If $j>1$, the PUSCH transmission is scheduled by a DCI format 0_1 that includes a SRI field, and the UE is provided higher layer parameter *SRI-PUSCH-PowerControl*, the UE determines the value of $l$ from the value of $j$ based on an indication by the SRI field for a *sri-PUSCH-PowerControlId* value associated with the *sri-P0-PUSCH-AlphaSetId* value corresponding to $j$ and with the *sri-PUSCH-ClosedLoopIndex* value corresponding to $l$

- If $j>1$ and the PUSCH transmission is scheduled by a DCI format 0_0 or by a DCI format 0_1 that does not include a SRI field or the UE is not provided higher layer parameter *SRI-PUSCH-PowerControl*, $l = 0$

- If $j=1$, $l$ is provided by the value of higher layer parameter *powerControlLoopToUse*

- $f_{b,f,c}(0,l) = 0$ is the first value after reset of accumulation.

- $f_{b,f,c}(i,l) = \delta_{\text{PUSCH},b,f,c}(i_{\text{last}},i,K_{\text{PUSCH}},l)$ is the PUSCH power control adjustment state for UL BWP $b$ of carrier $f$ of serving cell $c$ and PUSCH transmission occasion $i$ if accumulation is not enabled based on higher layer parameter *tpc-Accumulation*, where

12  Bandwidth part operation

If the UE is configured with a SCG, the UE shall apply the procedures described in this clause for both MCG and SCG

- When the procedures are applied for MCG, the terms 'secondary cell', 'secondary cells', 'serving cell', 'serving cells' in this clause refer to secondary cell, secondary cells, serving cell, serving cells belonging to the MCG respectively.

- When the procedures are applied for SCG, the terms 'secondary cell', 'secondary cells', 'serving cell', 'serving cells' in this clause refer to secondary cell, secondary cells (not including PSCell), serving cell, serving cells belonging to the SCG respectively. The term 'primary cell' in this clause refers to the PSCell of the SCG.

A UE configured for operation in bandwidth parts (BWPs) of a serving cell, is configured by higher layers for the serving cell a set of at most four bandwidth parts (BWPs) for receptions by the UE (DL BWP set) in a DL bandwidth by parameter *BWP-Downlink* and a set of at most four BWPs for transmissions by the UE (UL BWP set) in an UL bandwidth by parameter *BWP-Uplink* for the serving cell.

An initial active DL BWP is defined by a location and number of contiguous PRBs, a subcarrier spacing, and a cyclic prefix, for the control resource set for Type0-PDCCH common search space. For operation on the primary cell or on a secondary cell, a UE is provided an initial active UL BWP by higher layer parameter *initialuplinkBWP*. If the UE is configured with a supplementary carrier, the UE can be provided an initial UL BWP on the supplementary carrier by higher layer parameter *initialUplinkBWP* in *supplementaryUplink*.

If a UE has dedicated BWP configuration, the UE can be provided by higher layer parameter *firstActiveDownlinkBWP-Id* a first active DL BWP for receptions and by higher layer parameter *firstActiveUplinkBWP-Id* a first active UL BWP for transmissions on the primary cell.

For each DL BWP or UL BWP in a set of DL BWPs or UL BWPs, respectively, the UE is configured the following parameters for the serving cell as defined in [4, TS 38.211] or [6, TS 38.214]:

- a subcarrier spacing provided by higher layer parameter *subcarrierSpacing*;

- a cyclic prefix provided by higher layer parameter *cyclicPrefix*;

- a first PRB and a number of contiguous PRBs indicated by higher layer parameter *locationAndBandwidth* that is interpreted as RIV according to [4, TS 38.214], setting $N_{BWP}^{size}$ =275, and the first PRB is a PRB offset relative to the PRB indicated by higher layer parameters *offsetToCarrier* and *subcarrierSpacing*;

- an index in the set of DL BWPs or UL BWPs by respective higher layer parameter *bwp-Id*;

- a set of BWP-common and a set of BWP-dedicated parameters by higher layer parameters *bwp-Common* and *bwp-Dedicated* [12, TS 38.331]

For unpaired spectrum operation, a DL BWP from the set of configured DL BWPs with index provided by higher layer parameter *bwp-Id* for the DL BWP is linked with an UL BWP from the set of configured UL BWPs with index provided by higher layer parameter *bwp-Id* for the UL BWP when the DL BWP index and the UL BWP index are equal. For unpaired spectrum operation, a UE does not expect to receive a configuration where the center frequency for a DL BWP is different than the center frequency for an UL BWP when the *bwp-Id* of the DL BWP is equal to the *bwp-Id* of the UL BWP.

For each DL BWP in a set of DL BWPs on the primary cell, a UE can be configured control resource sets for every type of common search space and for UE-specific search space as described in Subclause 10.1. The UE does not expect to be configured without a common search space on the PCell, or on the PSCell, in the active DL BWP.

For each UL BWP in a set of UL BWPs, the UE is configured resource sets for PUCCH transmissions as described in Subclause 9.2.

A UE receives PDCCH and PDSCH in a DL BWP according to a configured subcarrier spacing and CP length for the DL BWP. A UE transmits PUCCH and PUSCH in an UL BWP according to a configured subcarrier spacing and CP length for the UL BWP.

If a bandwidth part indicator field is configured in DCI format 1_1, the bandwidth part indicator field value indicates the active DL BWP, from the configured DL BWP set, for DL receptions. If a bandwidth part indicator field is configured in DCI format 0_1, the bandwidth part indicator field value indicates the active UL BWP, from the configured UL BWP set, for UL transmissions. If a bandwidth part indicator field is configured in DCI format 0_1 or DCI format 1_1 and indicates an UL BWP or a DL BWP different from the active UL BWP or DL BWP, respectively, the UE shall

- for each information field in the received DCI format 0_1 or DCI format 1_1

- if the size of the information field is smaller than the one required for the DCI format 0_1 or DCI format 1_1 interpretation for the UL BWP or DL BWP that is indicated by the bandwidth part indicator, respectively, the UE prepends zeros to the information field until its size is the one required for the interpretation of the information field for the UL BWP or DL BWP prior to interpreting the DCI format 0_1 or DCI format 1_1 information fields, respectively;

- if the size of the information field is larger than the one required for the DCI format 0_1 or DCI format 1_1 interpretation for the UL BWP or DL BWP that is indicated by the bandwidth part indicator, respectively, the UE uses a number of least significant bits of DCI format 0_1 or DCI format 1_1 equal to the one required for the UL BWP or DL BWP indicated by bandwidth part indicator prior to interpreting the DCI format 0_1 or DCI format 1_1 information fields, respectively;

- set the active UL BWP or DL BWP to the UL BWP or DL BWP indicated by the bandwidth part indicator in the DCI format 0_1 or DCI format 1_1, respectively.

A UE expects to detect a DCI format 0_1 indicating active UL BWP change, or a DCI format 1_1 indicating active DL BWP change, only if a corresponding PDCCH is received within the first 3 symbols of a slot.

For the primary cell, a UE can be provided by higher layer parameter *defaultDownlinkBWP-Id* a default DL BWP among the configured DL BWPs. If a UE is not provided a default DL BWP by higher layer parameter *defaultDownlinkBWP-Id*, the default DL BWP is the initial active DL BWP.

If a UE is configured for a secondary cell with higher layer parameter *defaultDownlinkBWP-Id* indicating a default DL BWP among the configured DL BWPs and the UE is configured with higher layer parameter *bwp-InactivityTimer* indicating a timer value, the UE procedures on the secondary cell are same as on the primary cell using the timer value for the secondary cell and the default DL BWP for the secondary cell.

If a UE is configured by higher layer parameter *bwp-InactivityTimer* a timer value for the primary cell [11, TS 38.321] and the timer is running, the UE increments the timer every interval of 1 millisecond for frequency range 1 or every 0.5 milliseconds for frequency range 2 if the UE does not detect a DCI format for PDSCH reception on the primary cell for paired spectrum operation or if the UE does not detect a DCI format for PDSCH reception or a DCI format for PUSCH transmission on the primary cell for unpaired spectrum operation during the interval [11, TS 38.321].

If a UE is configured by higher layer parameter BWP-InactivityTimer a timer value for a secondary cell [11, TS 38.321] and the timer is running, the UE increments the timer every interval of 1 millisecond for frequency range 1 or every 0.5 milliseconds for frequency range 2 if the UE does not detect a DCI format for PDSCH reception on the secondary cell for paired spectrum operation or if the UE does not detect a DCI format for PDSCH reception or a DCI format for PUSCH transmission on the secondary cell for unpaired spectrum operation during the interval. The UE may deactivate the secondary cell when the timer expires.

If a UE is configured by higher layer parameter *firstActiveDownlinkBWP-Id* a first active DL BWP and by higher layer parameter *firstActiveUplinkBWP-Id* a first active UL BWP on a secondary cell or supplementary carrier, the UE uses the indicated DL BWP and the indicated UL BWP on the secondary cell as the respective first active DL BWP and first active UL BWP on the secondary cell or supplementary carrier.

For paired spectrum operation, a UE does not expect to transmit HARQ-ACK information on a PUCCH resource indicated by a DCI format 1_0 or a DCI format 1_1 if the UE changes its active UL BWP on the PCell between a time of a detection of the DCI format 1_0 or the DCI format 1_1 and a time of a corresponding HARQ-ACK information transmission on the PUCCH.

A UE does not expect to monitor PDCCH when the UE performs RRM measurements [10, TS 38.133] over a bandwidth that is not within the active DL BWP for the UE.

[0037] In 3GPP TS 38.331 V15.2.1 (2018-6), information elements (IEs) related to PUSCH pathloss and BWP in TS 38.331 are quoted below:

BWP

The *BWP* IE is used to configure a bandwidth part as defined in 38.211, section 4.2.2.

For each serving cell the network configures at least an initial bandwidth part comprising of at least a downlink bandwidth part and one (if the serving cell is configured with an uplink) or two (if using supplementary uplink (SUL)) uplink bandwidth parts. Furthermore, the network may configure additional uplink and downlink bandwidth parts for a serving cell.

The bandwidth part configuration is split into uplink and downlink parameters and into common and dedicated parameters. Common parameters (in BWP-UplinkCommon and BWP-DownlinkCommon) are "cell specific" and the network ensures the necessary alignment with corresponding parameters of other UEs. The common parameters of the initial bandwidth part of the PCell are also provided via system information. For all other serving cells, the network provides the common parameters via dedicated signalling.

*BWP* information element

```
-- ASN1START
-- TAG-BANDWIDTH-PART-START

BWP ::=                         SEQUENCE {
    locationAndBandwidth            INTEGER (0..37949),
    subcarrierSpacing               SubcarrierSpacing,
    cyclicPrefix                    ENUMERATED { extended }
OPTIONAL    -- Need R
}

BWP-Uplink ::=                  SEQUENCE {
    bwp-Id                          BWP-Id,
    bwp-Common                      BWP-UplinkCommon
OPTIONAL,   -- Need M
    bwp-Dedicated                   BWP-UplinkDedicated
OPTIONAL,   -- Need M
    ...
}

BWP-UplinkCommon ::=            SEQUENCE {
    genericParameters               BWP,
    rach-ConfigCommon               SetupRelease { RACH-ConfigCommon }
OPTIONAL,   -- Need M
    pusch-ConfigCommon              SetupRelease { PUSCH-ConfigCommon }
OPTIONAL,   -- Need M pucch-ConfigCommon              SetupRelease { PUCCH-ConfigCommon }
```

```
OPTIONAL,    -- Need M
    ...
}

BWP-UplinkDedicated ::=              SEQUENCE {
    pucch-Config                     SetupRelease { PUCCH-Config }
OPTIONAL,    -- Need M
    pusch-Config                     SetupRelease { PUSCH-Config }
OPTIONAL,    -- Cond SetupOnly
    configuredGrantConfig            SetupRelease { ConfiguredGrantConfig }
OPTIONAL,    -- Need M
    srs-Config                       SetupRelease { SRS-Config }
OPTIONAL,    -- Need M
    beamFailureRecoveryConfig        SetupRelease { BeamFailureRecoveryConfig }
OPTIONAL,    -- Cond SpCellOnly
    ...
}

BWP-Downlink ::=                     SEQUENCE {
    bwp-Id                           BWP-Id,
    bwp-Common                       BWP-DownlinkCommon
OPTIONAL,    -- Need M
    bwp-Dedicated                    BWP-DownlinkDedicated
OPTIONAL,    -- Need M
    ...
}

BWP-DownlinkCommon ::=               SEQUENCE {
    genericParameters                BWP,
    pdcch-ConfigCommon               SetupRelease { PDCCH-ConfigCommon }
OPTIONAL,    -- Need M
    pdsch-ConfigCommon               SetupRelease { PDSCH-ConfigCommon }
OPTIONAL,    -- Need M
    ...
}

BWP-DownlinkDedicated ::=            SEQUENCE {
    pdcch-Config                     SetupRelease { PDCCH-Config }
OPTIONAL,    -- Need M
    pdsch-Config                     SetupRelease { PDSCH-Config }
OPTIONAL,    -- Need M
    sps-Config                       SetupRelease { SPS-Config }
OPTIONAL,    -- Need M
    radioLinkMonitoringConfig        SetupRelease { RadioLinkMonitoringConfig }
OPTIONAL,    -- Need M
    ...
```

| BWP field descriptions |
|---|
| *cyclicPrefix* |
| Indicates whether to use the extended cyclic prefix for this bandwidth part. If not set, the UE uses the normal cyclic prefix. Normal CP is supported for all numerologies and slot formats. Extended CP is supported only for 60 kHz subcarrier spacing. (see 38.211, section 4.2.2) |
| *locationAndBandwidth* |
| Frequency domain location and bandwidth of this bandwidth part. The value of the field shall be interpreted as resource indicator value (RIV) as defined TS 38.214 with assumptions as described in TS 38.213, section 12, i.e. setting $N_{BWP}^{size}$=275. The first PRB is a PRB determined by subcarrierSpacing of this BWP and offsetToCarrier (configured in SCS-SpecificCarrier contained within FrequencyInfoDL) corresponding to this subcarrier spacing. In case of TDD, a BWP-pair (UL BWP and DL BWP with the same bwp-Id) must have the same center frequency (see 38.213, section 12) |
| *subcarrierSpacing* |
| Subcarrier spacing to be used in this BWP for all channels and reference signals unless explicitly configured elsewhere. Corresponds to subcarrier spacing according to 38.211, Table 4.2-1. The value kHz15 corresponds to µ=0, kHz30 to µ=1, and so on. Only the values 15, 30, or 60 kHz (<6GHz), and 60 or 120 kHz (>6GHz) are applicable. |

| BWP-Downlink field descriptions |
|---|
| *bwp-Id* |
| An identifier for this bandwidth part. Other parts of the RRC configuration use the BWP-Id to associate themselves with a particular bandwidth part. The BWP ID=0 is always associated with the initial BWP and may hence not be used here (in other bandwidth parts). |
| The NW may trigger the UE to swtich UL or DL BWP using a DCI field. The four code points in that DCI field map to the RRC-configured BWP-ID as follows: For up to 3 configured BWPs (in addition to the initial BWP) the DCI code point is equivalent to the BWP ID (initial = 0, first dedicated = 1, ...). If the NW configures 4 dedicated bandwidth parts, they are identified by DCI code points 0 to 3. In this case it is not possible to switch to the initial BWP using the DCI field. Corresponds to L1 parameter 'DL-BWP-index'. (see 38.211, 38.213, section 12) |

| BWP-Uplink field descriptions |
|---|
| *bwp-Id* |
| An identifier for this bandwidth part. Other parts of the RRC configuration use the BWP-Id to associate themselves with a particular bandwidth part. The BWP ID=0 is always associated with the initial BWP and may hence not be used here (in other bandwidth parts). The NW may trigger the UE to swtich UL or DL BWP using a DCI field. The four code points in that DCI field map to the RRC-configured BWP-ID as follows: For up to 3 configured BWPs (in addition to the initial BWP) the DCI code point is equivalent to the BWP ID (initial = 0, first dedicated = 1, ...). If the NW configures 4 dedicated bandwidth parts, they are identified by DCI code points 0 to 3. In this case it is not possible to switch to the initial BWP using the DCI field. Corresponds to L1 parameter 'UL-BWP-index'. (see 38.211, 38.213, section 12) |

| BWP-UplinkCommon field descriptions |
|---|
| *pucch-ConfigCommon* |
| Cell specific parameters for the PUCCH |
| *pusch-ConfigCommon* |
| Cell specific parameters for the PUSCH |
| *rach-ConfigCommon* |
| Configuration of cell specific random access parameters which the UE uses for contention based and contention free random access as well as for contention based beam failure recovery. The NW configures SSB-based RA (and hence RACH-ConfigCommon) only for UL BWPs if the linked DL BWPs allows the UE to acquire the SSB associated to the serving cell. |

| BWP-UplinkDedicated field descriptions |
|---|
| beamFailureRecoveryConfig |
| Determines how the UE performs Beam Failure Recovery upon detection of a Beam Failure (see RadioLinkMonitoringConfig) |
| configuredGrantConfig |
| A Configured-Grant of typ1 or type2. It may be configured for UL or SUL but in case of type1 [FFS also type2] not for both at a time. |
| pucch-Config |
| PUCCH configuration for one BWP of the regular UL or SUL of a serving cell. If the UE is configured with SUL, the network configures PUCCH only on the BWPs of one of the uplinks (UL or SUL).The network configures PUCCH-Config for each SpCell. If supported by the UE, the network may configure at most one additional SCell of a cell group with PUCCH-Config (i.e. PUCCH SCell). |
| pusch-Config |
| PUSCH configuration for one BWP of the regular UL or SUL of a serving cell. If the UE is configured with SUL and if it has a PUSCH-Config for both UL and SUL, a carrier indicator field in DCI indicates for which of the two to use an UL grant. See also L1 parameter 'dynamicPUSCHSUL' (see 38.213, section FFS_Section) |
| srs-Config |
| Uplink sounding reference signal configuration |

| Conditional Presence | Explanation |
|---|---|
| *SetupOnly* | The field is optionally present, Need M, upon configuration of a new SCell. It is absent otherwise. |
| *SpCellOnly* | The field is optionally present, Need M, in the BWP-UplinkDedicated of an SpCell. It is absent otherwise. |

– *PUSCH-Config*

The IE *PUSCH-Config* is used to configure the UE specific PUSCH parameters applicable to a particular BWP.

PUSCH-Config information element

```
-- ASN1START
-- TAG-PUSCH-CONFIG-START

PUSCH-Config ::=                        SEQUENCE {
    dataScramblingIdentityPUSCH             INTEGER (0..1023)
    txConfig                                ENUMERATED {codebook, nonCodebook}
    dmrs-UplinkForPUSCH-MappingTypeA        SetupRelease { DMRS-UplinkConfig }
    dmrs-UplinkForPUSCH-MappingTypeB        SetupRelease { DMRS-UplinkConfig } pusch-PowerControl                      PUSCH-PowerControl
```

— *PUSCH-PowerControl*

The IE *PUSCH-PowerControl* is used to configure UE specific power control parameter for PUSCH.

PUSCH-PowerControl information element

```
-- ASN1START
-- TAG-PUSCH-POWERCONTROL-START

PUSCH-PowerControl ::=            SEQUENCE {
    tpc-Accumulation              ENUMERATED { disabled }
    msg3-Alpha                    Alpha
    p0-NominalWithoutGrant        INTEGER (-202..24)
    p0-AlphaSets                  SEQUENCE (SIZE (1..maxNrofP0-PUSCH-AlphaSets)) OF P0-
PUSCH-AlphaSet          OPTIONAL,  -- Need M,
    pathlossReferenceRSToAddModList   SEQUENCE (SIZE (1..maxNrofPUSCH-PathlossReferenceRSs)) OF
PUSCH-PathlossReferenceRS pathlossReferenceRSToReleaseList  SEQUENCE (SIZE (1..maxNrofPUSCH-PathlossReferenceRSs)) OF
PUSCH-PathlossReferenceRS-Id twoPUSCH-PC-AdjustmentStates  ENUMERATED {twoStates}
    deltaMCS                      ENUMERATED {enabled}
    sri-PUSCH-MappingToAddModList SEQUENCE (SIZE (1..maxNrofSRI-PUSCH-Mappings)) OF SRI-
PUSCH-PowerControl    OPTIONAL,  -- Need O
    sri-PUSCH-MappingToReleaseList    SEQUENCE (SIZE (1..maxNrofSRI-PUSCH-Mappings)) OF SRI-
PUSCH-PowerControlId  OPTIONAL  -- Need N
}

-- A set of p0-pusch and alpha used for PUSCH with grant. 'PUSCH beam indication' (if present)
gives the index of the set to
-- be used for a particular PUSCH transmission.
-- FFS_CHECK: Is the "PUSCH beam indication" in DCI which schedules the PUSCH? If so, clarify in
field description
-- Corresponds to L1 parameter 'p0-pusch-alpha-set' (see 38.213, section 7.1)
PC-PUSCH-AlphaSet ::=             SEQUENCE {
    p0-PUSCH-AlphaSetId           P0-PUSCH-AlphaSetId,
    p0                            INTEGER (-16..15)
    alpha                         Alpha
}

-- ID for a PC-PUSCH-AlphaSet. Corresponds to L1 parameter 'p0alphaSetIndex' (see 38.213, section
7.1)
PC-PUSCH-AlphaSetId ::=           INTEGER (0..maxNrofP0-PUSCH-AlphaSets-1)
```

```
-- A reference signal (RS) configured as pathloss reference signal for PUSCH power control
-- Corresponds to L1 parameter 'pusch-pathlossReference-rs' (see 38.213, section 7.1)
PUSCH-PathlossReferenceRS ::=      SEQUENCE {
    pusch-PathlossReferenceRS-Id       PUSCH-PathlossReferenceRS-Id,
    referenceSignal                    CHOICE {
        ssb-Index                          SSB-Index,
        csi-RS-Index                       NZP-CSI-RS-ResourceId
    }
}

-- ID for a reference signal (RS) configured as PUSCH pathloss reference
-- Corresponds to L1 parameter 'pathlossreference-index' (see 38.213, section 7.1)
-- FFS_CHECK: Is this ID used anywhere except inside the PUSCH-PathlossReference-RS itself?
PUSCH-PathlossReferenceRS-Id ::=   INTEGER (0..maxNrofPUSCH-PathlossReferenceRSs-1)

-- A set of PUSCH power control parameters associated with one SRS-ResourceIndex (SRI)
SRI-PUSCH-PowerControl ::=         SEQUENCE {
    sri-PUSCH-PowerControlId           SRI-PUSCH-PowerControlId,
    sri-PUSCH-PathlossReferenceRS-Id   PUSCH-PathlossReferenceRS-Id,
    sri-PC-PUSCH-AlphaSetId            PC-PUSCH-AlphaSetId,
    sri-PUSCH-ClosedLoopIndex          ENUMERATED { i0, i1 }
}

SRI-PUSCH-PowerControlId ::=       INTEGER (0..maxNrofSRI-PUSCH-Mappings-1)
```

| P0-PUSCH-AlphaSet field descriptions |
| --- |
| *alpha* <br> alpha value for PUSCH with grant (except msg3) (see 38.213, section 7.1) When the field is absent the UE applies the value 1 |
| *p0* <br> P0 value for PUSCH with grant (except msg3) in steps of 1dB. Corresponds to L1 parameter 'p0-pusch' (see 38,213, section 7.1) |

| PUSCH-PowerControl field descriptions |
|---|
| deltaMCS |
| Indicates whether to apply dela MCS. When the field is absent, the UE applies Ks = 0 in delta_TFC formula for PUSCH. Corresponds to L1 parameter 'deltaMCS-Enabled' (see 38.213, section 7.1) |
| msg3-Alpha |
| Dedicated alpha value for msg3 PUSCH. Corresponds to L1 parameter 'alpha-ue-pusch-msg3' (see 38.213, section 7.1) When the field is absent the UE applies the value 1. |
| p0-AlphaSets |
| configuration {p0-pusch,alpha} sets for PUSCH (except msg3), i.e., { {p0,alpha,index1}, {p0,alpha,index2},...}. Corresponds to L1 parameter 'p0-push-alpha-setconfig' (see 38,213, section 7.1) |
| p0-NominalWithoutGrant |
| P0 value for UL grant-free/SPS based PUSCH. Value in dBm. Only even values (step size 2) allowed. Corresponds to L1 parameter 'p0-nominal-pusch-withoutgrant' (see 38.213, section 7.1) |
| pathlossReferenceRSToAddModList |
| A set of Reference Signals (e.g. a CSI-RS config or a SSblock) to be used for PUSCH path loss estimation. Up to maxNrofPUSCH-PathlossReferenceRSs may be configured when 'PUSCH beam indication' is present (FFS: in DCI???). Otherwise, there may be only one entry. Corresponds to L1 parameter 'pusch-pathlossReference-rs-config' (see 38.213, section 7.1) |
| sri-PUSCH-MappingToAddModList |
| A list of SRI-PUSCH-PowerControl elements among which one is selected by the SRI field in DCI. Corresponds to L1 parameter 'SRI-PUSCHPowerControl-mapping' (see 38.213, section 7.1) |
| tpc-Accumulation |
| If enabled, UE applies TPC commands via accumulation. If not enabled, UE applies the TPC command without accumulation. If the field is absent, TPC accumulation is enabled. Corresponds to L1 parameter 'Accumulation-enabled' (see 38.213, section 7.1) |
| twoPUSCH-PC-AdjustmentStates |
| Number of PUSCH power control adjustment states maintained by the UE (i.e., fc(i)). If the field is present (n2) the UE maintains two power control states (i.e., fc(i,1) and fc(i,2)). If the field is absent, it applies one (i.e., fc(i,1)). Corresponds to L1 parameter 'num-pusch-pcadjustment-states' (see 38.213, section 7.1) |

| SRI-PUSCH-PowerControl field descriptions |
| --- |
| sri-P0-PUSCH-AlphaSetId |
| The ID of a P0-PUSCH-AlphaSet as configured in p0-AlphaSets in PUSCH-PowerControl. |
| sri-PUSCH-ClosedLoopIndex |
| The index of the closed power control loop associated with this SRI-PUSCH-PowerControl |
| sri-PUSCH-PathlossReferenceRS-Id |
| The ID of PUSCH-PathlossReferenceRS as configured in the pathlossReferenceRSToAddModList in PUSCH-PowerControl. |
| sri-PUSCH-PowerControlId |
| The ID of this SRI-PUSCH-PowerControl configuration. It is used as the codepoint (payload) in the SRI DCI field. |

– *NZP-CSI-RS-Resource*

The IE *NZP-CSI-RS-Resource* is used to configure Non-Zero-Power (NZP) CSI-RS transmitted in the cell where the IE is included, which the UE may be configured to measure on (see 38.214, section 5.2.2.3.1).

NZP-CSI-RS-Resource information element

```
-- ASN1START
-- TAG-NZP-CSI-RS-RESOURCE-START

NZP-CSI-RS-Resource ::=        SEQUENCE {
    nzp-CSI-RS-ResourceId          NZP-CSI-RS-ResourceId,
    resourceMapping                CSI-RS-ResourceMapping,
    powerControlOffset             INTEGER (-8..15),
    powerControlOffsetSS           ENUMERATED {db-3, db0, db3, db6}
OPTIONAL,    -- Need R
    scramblingID                   ScramblingId,
    periodicityAndOffset           CSI-ResourcePeriodicityAndOffset
OPTIONAL,    -- Cond PeriodicOrSemiPersistent
    qcl-InfoPeriodicCSI-RS         TCI-StateId
OPTIONAL,    -- Cond Periodic
    ...
}

-- TAG-NZP-CSI-RS-RESOURCE-STOP
-- ASN1STOP
```

| NZP-CSI-RS-Resource field descriptions |
|---|
| periodicityAndOffset |
| Periodicity and slot offset *sl1* corresponds to a periodicity of 1 slot, *sl2* to a periodicity of two slots, and so on. The corresponding offset is also given in number of slots. Corresponds to L1 parameter 'CSI-RS-timeConfig' (see 38.214, section 5.2.2.3.1) |
| powerControlOffset |
| Power offset of NZP CSI-RS RE to PDSCH RE. Value in dB. Corresponds to L1 parameter Pc (see 38.214, sections 5.2.2.3.1 and 4.1) |
| powerControlOffsetSS |
| Power offset of NZP CSI-RS RE to SS RE. Value in dB. Corresponds to L1 parameter 'Pc_SS' (see 38.214, section 5.2.2.3.1) |
| qcl-InfoPeriodicCSI-RS |
| For a target periodic CSI-RS, contains a reference to one TCI-State in TCI-States for providing the QCL source and QCL type. For periodic CSI-RS, the source can be SSB or another periodic-CSI-RS. Refers to the TCI-State which has this value for tci-StateId and is defined in *tci-StatesToAddModList* in the *PDSCH-Config* included in the *BWP-Downlink* corresponding to the serving cell and to the DL BWP to which the resource belong to. Corresponds to L1 parameter 'QCL-Info-PeriodicCSI-RS' (see 38.214, section 5.2.2.3.1) |
| resourceMapping |
| OFDM symbol location(s) in a slot and subcarrier occupancy in a PRB of the CSI-RS resource |
| scramblingID |
| Scrambling ID (see 38.214, section 5.2.2.3.1) |

– *ServingCellConfig*

The *ServingCellConfig* IE is used to configure (add or modify) the UE with a serving cell, which may be the SpCell or an SCell of an MCG or SCG. The parameters herein are mostly UE specific but partly also cell specific (e.g. in additionally configured bandwidth parts).

***ServingCellConfig* information element**

```
-- ASN1START
-- TAG-SERVING-CELL-CONFIG-START

ServingCellConfig ::=           SEQUENCE {
    tdd-UL-DL-ConfigurationDedicated    TDD-UL-DL-ConfigDedicated
OPTIONAL,    -- Cond TDD initialDownlinkBWP          BWP-DownlinkDedicated
OPTIONAL,    -- Cond ServCellAdd
    downlinkBWP-ToReleaseList   SEQUENCE (SIZE (1..maxNrofBWPs)) OF BWP-Id
OPTIONAL,    -- Need N
```

```
    downlinkBWP ToAddModList        SEQUENCE (SIZE (1..maxNrofBWPs)) OF BWP Downlink
OPTIONAL,     -- Need R
    firstActiveDownlinkBWP-Id       BWP-Id
OPTIONAL,     -- Cond SyncAndCellAdd
    bwp-InactivityTimer             ENUMERATED { ms2, ms3, ms4, ms5, ms6, ms8, ms10, ms20,
ms30,
                                                ms40, ms50, ms60, ms80, ms100, ms200, ms300,
ms500,
                                                ms750, ms1280, ms1920, ms2560, spare10,
spare9, spare8,
                                                spare7, spare6, spare5, spare4, spare3,
spare2, spare1 }   OPTIONAL,  -- Need R
    defaultDownlinkBWP-Id           BWP-Id
OPTIONAL,    -- Need S uplinkConfig                    UplinkConfig
OPTIONAL,    -- Cond ServCellAdd-UL
    supplementaryUplink             UplinkConfig
OPTIONAL,    -- Cond ServCellAdd-SUL pdcch-ServingCellConfig         SetupRelease { PDCCH-ServingCellConfig }
OPTIONAL,    -- Need M
    pdsch-ServingCellConfig         SetupRelease { PDSCH-ServingCellConfig }
OPTIONAL,    -- Need M
    csi-MeasConfig                  SetupRelease { CSI-MeasConfig }
OPTIONAL,    -- Need M
    sCellDeactivationTimer          ENUMERATED { ms20, ms40, ms80, ms160, ms200, ms240,
                                                ms320, ms400, ms480, ms520, ms640, ms720,
                                                ms840, ms1280, spare2, spare1}
OPTIONAL,    -- Cond ServingCellWithoutPUCCH
    crossCarrierSchedulingConfig    CrossCarrierSchedulingConfig
OPTIONAL,    -- Need M
    tag-Id                          TAG-Id,
    ue-BeamLockFunction             ENUMERATED {enabled}
OPTIONAL,    -- Need R pathlossReferenceLinking        ENUMERATED {pCell, sCell}
OPTIONAL,    -- Cond SCellOnly
    servingCellMO                   MeasObjectId
OPTIONAL,    -- Cond MeasObject
    ...
}

UplinkConfig ::=                    SEQUENCE {
    initialUplinkBWP                BWP-UplinkDedicated
OPTIONAL,    -- Cond ServCellAdd
```

```
    uplinkBWP-ToReleaseList          SEQUENCE (SIZE (1..maxNrofBWPs)) OF BWP-Id
OPTIONAL,    -- Need R
    uplinkBWP-ToAddModList           SEQUENCE (SIZE (1..maxNrofBWPs)) OF BWP-Uplink
OPTIONAL,    -- Need N
    firstActiveUplinkBWP-Id          BWP-Id
OPTIONAL,    -- Cond SyncAndCellAdd pusch-ServingCellConfig          SetupRelease { PUSCH-ServingCellConfig }
OPTIONAL,    -- Need M
    carrierSwitching                 SetupRelease { SRS-CarrierSwitching }
OPTIONAL,    -- Need M
    ...
}

-- TAG-SERVING-CELL-CONFIG-STOP
-- ASN1STOP
```

| *ServingCellConfig field descriptions* |
|---|
| *bwp-InactivityTimer*<br>The duration in ms after which the UE falls back to the default Bandwidth Part. (see 38.321, section 5.15) The value 0.5 ms is only applicable for carriers >6 GHz. When the network releases the timer configuration, the UE stops the timer without swithching to the default BWP. |
| *crossCarrierSchedulingConfig*<br>Indicates whether this SCell is cross-carrier scheduled by another serving cell. |
| *defaultDownlinkBWP-Id*<br>Corresponds to L1 parameter 'default-DL-BWP'. The initial bandwidth part is referred to by BWP-Id = 0. ID of the downlink bandwidth part to be used upon expiry of txxx. This field is UE specific. When the field is absent the UE uses the the initial BWP as default BWP. (see 38.211, 38.213, section 12 and 38.321, section 5.15) |
| *downlinkBWP-ToAddModList*<br>List of additional downlink bandwidth parts to be added or modified. (see 38.211, 38.213, section 12). |
| *downlinkBWP-ToReleaseList*<br>List of additional downlink bandwidth parts to be released. (see 38.211, 38.213, section 12). |
| *firstActiveDownlinkBWP-Id*<br>If configured for an SpCell, this field contains the ID of the DL BWP to be activated upon performing the reconfiguration in which it is received. If the field is absent, the RRC reconfiguration does not impose a BWP switch (corresponds to L1 parameter 'active-BWP-DL-Pcell').<br>If configured for an SCell, this field contains the ID of the downlink bandwidth part to be used upon MAC-activation of an SCell. The initial bandwidth part is referred to by BWP-Id = 0. |
| *initialDownlinkBWP*<br>The dedicated (UE-specific) configuration for the initial downlink bandwidth-part. |
| *pathlossReferenceLinking*<br>Indicates whether UE shall apply as pathloss reference either the downlink of PCell or of SCell that corresponds with this uplink (see 38.213, section 7) |
| *pdsch-ServingCellConfig*<br>PDSCH releated parameters that are not BWP-specific. |
| *sCellDeactivationTimer*<br>SCell deactivation timer in TS 38.321 [3]. If the field is absent, the UE applies the value infinity. |
| *servingCellMO*<br>*measObjectId* of the *MeasObjectNR* in *MeasConfig* which is associated to the serving cell. For this *MeasObjectNR*, the following relationship applies between this MeasObjectNR and *frequencyInfoDL* in *ServingCellConfigCommon* of the serving cell: if *ssbFrequency* is configured, its value is the same aslike the *absoluteFrequencySSB* and if *csi-rs-ResourceConfigMobility* is configured, the value of its *subcarrierSpacing* is present in one entry of the *scs-SpecificCarrierList*, *csi-RS-CellList-Mobility* includes an entry corresponding to the serving cell (with *cellId* equal to *physCellId* in *ServingCellConfigCommon*) and the frequency range indicated by the *csi-rs-MeasurementBW* of the entry in *csi-RS-CellList-Mobility* is included in the frequency range indicated by in the entry of the *scs-SpecificCarrierList*. |
| *tag-Id* |

| |
|---|
| Timing Advance Group ID, as specified in TS 38.321 [3], which this cell belongs to. |
| *ue-BeamLockFunction* |
| Enables the "UE beam lock function (UBF)", which disable changes to the UE beamforming configuration when in NR_RRC_CONNECTED. FFS: Parameter added preliminary based on RAN4 LS in R4-1711823. Decide where to place it (maybe ServingCellConfigCommon or in a BeamManagement IE??) |

| *UplinkConfig field descriptions* |
|---|
| *carrierSwitching* |
| Includes parameters for configuration of carrier based SRS switching Corresponds to L1 parameter 'SRS-CarrierSwitching' (see 38,214, section FFS_Section) |
| *firstActiveUplinkBWP-Id* |
| If configured for an SpCell, this field contains the ID of the DL BWP to be activated upon performing the reconfiguration in which it is received. If the field is absent, the RRC reconfiguration does not impose a BWP switch (corresponds to L1 parameter 'active-BWP-UL-Pcell').
If configured for an SCell, this field contains the ID of the uplink bandwidth part to be used upon MAC-activation of an SCell. The initial bandwidth part is referred to by BandiwdthPartId = 0. |
| *initialUplinkBWP* |
| The dedicated (UE-specific) configuration for the initial uplink bandwidth-part. |
| *pusch-ServingCellConfig* |
| PUSCH related parameters that are not BWP-specific. |
| *uplinkBWP-ToReleaseList* |
| The additional bandwidth parts for uplink. In case of TDD uplink- and downlink BWP with the same bandwidthPartId are considered as a BWP pair and must have the same center frequency. |

[0038] In 3GPP TS 38.211 V15.2.0 (2018-6), the description of downlink reference signals in TS 38.211 are quoted as below:

7.4 Physical signals

7.4.1 Reference signals

7.4.1.4 Demodulation reference signals for PBCH

7.4.1.4.1 Sequence generation

The UE shall assume the reference-signal sequence $r(m)$ for an SS/PBCH block is defined by $$r(m) = \frac{1}{\sqrt{2}}(1 - 2 \cdot c(2m)) + j\frac{1}{\sqrt{2}}(1 - 2 \cdot c(2m+1))$$

where $c(n)$ is given by clause 5.2. The scrambling sequence generator shall be initialized at the start of each SS/PBCH block occasion with $$c_{\text{init}} = 2^{11}\left(\bar{i}_{\text{SSB}}+1\right)\left(\left\lfloor N_{\text{ID}}^{\text{cell}}/4\right\rfloor+1\right)+2^{6}\left(\bar{i}_{\text{SSB}}+1\right)+\left(N_{\text{ID}}^{\text{cell}} \bmod 4\right)$$

where

- for $L = 4$, $\bar{i}_{\text{SSB}} = i_{\text{SSB}} + 4n_{\text{hf}}$ where $n_{\text{hf}}$ is the number of the half-frame in which the PBCH is transmitted in a frame with $n_{\text{hf}} = 0$ for the first half-frame in the frame and $n_{\text{hf}} = 1$ for the second half-frame in the frame, and $i_{\text{SSB}}$ is the two least significant bits of the SS/PBCH block index as defined in [5, TS 38.213]

- for $L = 8$ or $L = 64$, $\bar{i}_{\text{SSB}} = i_{\text{SSB}}$ where $i_{\text{SSB}}$ is the three least significant bits of the SS/PBCH block index as defined in [5, TS 38.213]

with $L$ being the maximum number of SS/PBCH beams in an SS/PBCH period for a particular band as given by [38.104].

7.4.1.4.2 Mapping to physical resources

Mapping to physical resources is described in clause 7.4.3.

7.4.1.5 CSI reference signals

7.4.1.5.1 General

Zero-power (ZP) and non-zero-power (NZP) CSI-RS are defined

- for a non-zero-power CSI-RS configured by the *NZP-CSI-RS-Resource* IE, the sequence shall be generated according to clause 7.4.1.5.2 and mapped to resource elements according to clause 7.4.1.5.3

- for a zero-power CSI-RS configured by the *ZP-CSI-RS-Resource* IE, the UE shall assume that the resource elements defined in clause 7.4.1.5.3 are not used for PDSCH transmission. The UE performs the same measurement/reception on channels/signals except PDSCH regardless of whether they collide with ZP CSI-RS or not.

7.4.1.5.2 Sequence generation

The UE shall assume the reference-signal sequence $r(m)$ is defined by $$r(m) = \frac{1}{\sqrt{2}}(1 - 2 \cdot c(2m)) + j\frac{1}{\sqrt{2}}(1 - 2 \cdot c(2m+1))$$

where the pseudo-random sequence $c(i)$ is defined in clause 5.2.1. The pseudo-random sequence generator shall be initialised with $$c_{\text{init}} = (2^{10}(N_{\text{symb}}^{\text{slot}} n_{s,f}^{\mu} + l + 1)(2n_{\text{ID}} + 1) + n_{\text{ID}}) \bmod 2^{31}$$

at the start of each OFDM symbol where $n_{s,f}^{\mu}$ is the slot number within a radio frame, $l$ is the OFDM symbol number within a slot, and $n_{\text{ID}}$ equals the higher-layer parameter s*cramblingID*.

7.4.1.5.3 Mapping to physical resources

For each CSI-RS configured, the UE shall assume the sequence $r(m)$ being mapped to resources elements $(k,l)_{p,\mu}$ according to $$a_{k,l}^{(p,\mu)} = \beta_{\text{CSIRS}} w_f(k') \cdot w_t(l') \cdot r_{l,n_{s,f}}(m')$$

$$m' = \lfloor n\alpha \rfloor + k' + \left\lfloor \frac{\bar{k}\rho}{N_{\text{sc}}^{\text{RB}}} \right\rfloor$$

$$k = nN_{\text{sc}}^{\text{RB}} + \bar{k} + k'$$

$$l = \bar{l} + l'$$

$$\alpha = \begin{cases} \rho & \text{for } X = 1 \\ 2\rho & \text{for } X > 1 \end{cases}$$

$$n = 0,1,...$$

when the following conditions are fulfilled:

- the resource element $(k,l)_{p,\mu}$ is within the resource blocks occupied by the CSI-RS resource for which the UE is configured The reference point for $k = 0$ is subcarrier 0 in common resource block 0.

The value of $\rho$ is given by the higher-layer parameter *density* in the *CSI-RS-ResourceMapping* IE and the number of ports $X$ is given by the higher-layer parameter *nrofPorts*.

The UE is not expected to receive CSI-RS and DM-RS on the same resource elements.

The UE shall assume $\beta_{CSIRS} > 0$ for a non-zero-power CSI-RS where $\beta_{CSIRS}$ is selected such that the power offset specified by the higher-layer parameter *powerControlOffsetSS* in the *NZP-CSI-RS-Resource* IE, if provided, is fulfilled.

The quantities $k'$, $l'$, $w_f(k')$, and $w_t(l')$ are given by Tables 7.4.1.5.3-1 to 7.4.1.5.3-6 where each $(\bar{k}, \bar{l})$ in a given row of Table 7.4.1.5.3-1 corresponds to a CDM group of size 1 (no CDM) or size 2, 4, or 8. The CDM type is provided by the higher layer parameter *cdmType* in the *CSI-RS-ResourceMapping* IE. The indices $k'$ and $l'$ index resource elements within a CDM group.

The time-domain locations $l_0 \in \{2, 3, ..., 12\}$ and $l_1 \in \{2, 3, ..., 12\}$ are provided by the higher-layer parameters *firstOFDMSymbolInTimeDomain* and *firstOFDMSymbolInTimeDomain2*, respectively, in the *CSI-RS-ResourceMapping* IE and defined relative to the start of a slot.

The frequency-domain location is given by a bitmap provided by the higher-layer parameter *frequencyDomainAllocation* in the *CSI-RS-ResourceMapping* IE with the bitmap and value of $k_i$ in Table 7.4.1.5.3-1 given by

- $[b_3 \cdots b_0]$, $k_i = f(i)$ for row 1 of Table 7.4.1.5.3-1

- $[b_{11} \cdots b_0]$, $k_i = f(i)$ for row 2 of Table 7.4.1.5.3-1

- $[b_2 \cdots b_0]$, $k_i = 4f(i)$ for row 4 of Table 7.4.1.5.3-1

- $[b_5 \cdots b_0]$, $k_i = 2f(i)$ for all other cases where $f(i)$ is the bit number of the $i^{th}$ bit in the bitmap set to one, repeated across every $1/\rho$ of the resource blocks configured for CSI-RS reception by the UE when $\rho \leq 1$. The starting position and number of the resource blocks in which the UE shall assume that CSI-RS is transmitted are given by the higher-layer parameters *freqBand* and *density* in the *CSI-RS-ResourceMapping* IE for the bandwidth part given by the higher-layer parameter *bwp-Id* in the *CSI-ResourceConfig* IE.

The UE shall assume that a CSI-RS is transmitted using antenna ports $p$ numbered according to $$p = 3000 + s + jL;$$
$$j = 0, 1, ..., N/L - 1$$
$$s = 0, 1, ..., L - 1;$$

where $s$ is the sequence index provided by Tables 7.4.1.5.3-2 to 7.4.1.5.3-5, $L \in \{1,2,4,8\}$ is the CDM group size, and $N$ is the number of CSI-RS ports. The CDM group index $j$ given in Table 7.4.1.5.3-1 corresponds to the time/frequency locations $(\bar{k}, \bar{l})$ for a given row of the table. The CDM groups are numbered in order of increasing frequency domain allocation first and then increasing time domain allocation. For a CSI-RS resource configured as periodic or semi-persistent by the higher-layer parameter *resourceType*, the UE shall assume that the CSI-RS is transmitted in slots satisfying $$\left(N_{\text{slot}}^{\text{frame},\mu} n_{\text{f}} + n_{\text{s,f}}^{\mu} - T_{\text{offset}}\right) \bmod T_{\text{CSI-RS}} = 0$$

where the periodicity $T_{\text{CSI-RS}}$ (in slots) and slot offset $T_{\text{offset}}$ are obtained from the higher-layer parameter *CSI-ResourcePeriodicityAndOffset*. The UE shall assume that CSI-RS is transmitted in a candidate slot only if all OFDM symbols of that slot corresponding to the configured CSI-RS resource are classified as 'downlink'.

The UE may assume that antenna ports within a CSI-RS resource are quasi-colocated with QCL Type A, Type D (when applicable), and average gain.

FIG. 5 (a reproduction of Table 7.4.1.5.3-1 taken from 3GPP TS 38.211 V15.2.0 (2018-6)).

FIG. 6 (a reproduction of Table 7.4.1.5.3-2 taken from 3GPP TS 38.211 V15.2.0 (2018-6)).

FIG. 7 (a reproduction of Table 7.4.1.5.3-3 taken from 3GPP TS 38.211 V15.2.0 (2018-6)).

FIG. 8 (a reproduction of Table 7.4.1.5.3-4 taken from 3GPP TS 38.211 V15.2.0 (2018-6)).

FIG. 9 (a reproduction of Table 7.4.1.5.3-5 taken from 3GPP TS 38.211 V15.2.0 (2018-6)).

7.4.2 Synchronization signals

7.4.2.1 Physical-layer cell identities

There are 1008 unique physical-layer cell identities given by $$N_{\text{ID}}^{\text{cell}} = 3 N_{\text{ID}}^{(1)} + N_{\text{ID}}^{(2)}$$

where $N_{\text{ID}}^{(1)} \in \{0,1,\ldots,335\}$ and $N_{\text{ID}}^{(2)} \in \{0,1,2\}$.

7.4.2.2 Primary synchronization signal

7.4.2.2.1 Sequence generation

The sequence $d_{\text{PSS}}(n)$ for the primary synchronization signal is defined by $$d_{\text{PSS}}(n) = 1 - 2x(m)$$
$$m = \left(n + 43 N_{\text{ID}}^{(2)}\right) \bmod 127$$
$$0 \leq n < 127$$

where $$x(i+7) = (x(i+4) + x(i)) \bmod 2$$

and $$[x(6) \ \ x(5) \ \ x(4) \ \ x(3) \ \ x(2) \ \ x(1) \ \ x(0)] = [1 \ 1 \ 1 \ 0 \ 1 \ 1 \ 0]$$

7.4.2.2.2 Mapping to physical resources

Mapping to physical resources is described in clause 7.4.3.

7.4.2.3 Secondary synchronization signal

7.4.2.3.1 Sequence generation

The sequence $d_{\text{SSS}}(n)$ for the secondary synchronization signal is defined by $$d_{\text{SSS}}(n) = [1 - 2x_0((n+m_0) \bmod 127)][1 - 2x_1((n+m_1) \bmod 127)]$$
$$m_0 = 15 \left\lfloor \frac{N_{\text{ID}}^{(1)}}{112} \right\rfloor + 5 N_{\text{ID}}^{(2)}$$
$$m_1 = N_{\text{ID}}^{(1)} \bmod 112$$
$$0 \leq n < 127$$

where $$x_0(i+7) = (x_0(i+4) + x_0(i)) \bmod 2$$
$$x_1(i+7) = (x_1(i+1) + x_1(i)) \bmod 2$$

and $$[x_0(6) \quad x_0(5) \quad x_0(4) \quad x_0(3) \quad x_0(2) \quad x_0(1) \quad x_0(0)] = [0 \quad 0 \quad 0 \quad 0 \quad 0 \quad 0 \quad 1]$$
$$[x_1(6) \quad x_1(5) \quad x_1(4) \quad x_1(3) \quad x_1(2) \quad x_1(1) \quad x_1(0)] = [0 \quad 0 \quad 0 \quad 0 \quad 0 \quad 0 \quad 1]$$

7.4.2.3.2  Mapping to physical resources

Mapping to physical resources is described in clause 7.4.3.

7.4.3  SS/PBCH block

7.4.3.1  Time-frequency structure of an SS/PBCH block

In the time domain, an SS/PBCH block consists of 4 OFDM symbols, numbered in increasing order from 0 to 3 within the SS/PBCH block, where PSS, SSS, and PBCH with associated DM-RS are mapped to symbols as given by Table 7.4.3.1-1.

In the frequency domain, an SS/PBCH block consists of 240 contiguous subcarriers with the subcarriers numbered in increasing order from 0 to 239 within the SS/PBCH block. The quantities $k$ and $l$ represent the frequency and time indices, respectively, within one SS/PBCH block. The UE may assume that the complex-valued symbols corresponding to resource elements denoted as 'Set to 0' in Table 7.4.3.1-1 are set to zero. The quantity $v$ in Table 7.4.3.1-1 is given by $v = N_{ID}^{cell} \bmod 4$. The quantity $k_{SSB}$ is the subcarrier offset from subcarrier 0 in common resource block $N_{CRB}^{SSB}$ to subcarrier 0 of the SS/PBCH block, where the 4 least significant bits of $k_{SSB}$ are given by the higher-layer parameter $ssb\text{-}SubcarrierOffset$ and for SS/PBCH block type A the most significant bit of $k_{SSB}$ is given by $a_{\overline{A}+5}$ in the PBCH payload as defined in subclause 7.1.1 of [4, TS 38.212]. If $ssb\text{-}SubcarrierOffset$ is not provided, $k_{SSB}$ is derived from the frequency difference between the SS/PBCH block and Point A.

The UE may assume that the complex-valued symbols corresponding to resource elements that are part of a common resource block partially or fully overlapping with an SS/PBCH block and not used for SS/PBCH transmission are set set to zero in the OFDM symbols where SS/PBCH block is transmitted.

For an SS/PBCH block, the UE shall assume

- antenna port $p = 4000$ is used for transmission of PSS, SSS and PBCH,

- the same cyclic prefix length and subcarrier spacing for the PSS, SSS, and PBCH,

- for SS/PBCH block type A, $\mu \in \{0,1\}$ and $k_{SSB} \in \{0,1,2,...,23\}$ with the quantities $k_{SSB}$, and $N_{CRB}^{SSB}$ expressed in terms of 15 kHz subcarrier spacing, and

- for SS/PBCH block type B, $\mu \in \{3,4\}$ and $k_{SSB} \in \{0,1,2,...,11\}$ with the quantity $k_{SSB}$ expressed in terms of the subcarrier spacing provided by the higher-layer parameter *subCarrierSpacingCommon* and $N_{CRB}^{SSB}$ is expressed in terms of 60 kHz subcarrier spacing.

The UE may assume that SS/PBCH blocks transmitted with the same block index on the same center frequency location are quasi co-located with respect to Doppler spread, Doppler shift, average gain, average delay, delay spread, and, when applicable, spatial Rx parameters. The UE shall not assume quasi co-location for any other SS/PBCH block transmissions.

FIG. 10 (a reproduction of Table 7.4.3.1-1 taken from 3GPP TS 38.211 V15.2.0 (2018-6)).

7.4.3.1.1  Mapping of PSS within an SS/PBCH block

The UE shall assume the sequence of symbols $d_{PSS}(0),...,d_{PSS}(126)$ constituting the primary synchronization signal to be scaled by a factor $\beta_{PSS}$ to conform to the PSS power allocation specified in [5, TS 38.213] and mapped to resource elements $(k,l)_{p,\mu}$ in increasing order of $k$ where $k$ and $l$ are given by Table 7.4.3.1-1 and represent the frequency and time indices, respectively, within one SS/PBCH block.

7.4.3.1.2  Mapping of SSS within an SS/PBCH block

The UE shall assume the sequence of symbols $d_{SSS}(0),...,d_{SSS}(126)$ constituting the secondary synchronization signal to be scaled by a factor $\beta_{SSS}$ and mapped to resource elements $(k,l)_{p,\mu}$ in increasing order of $k$ where $k$ and $l$ are given by Table 7.4.3.1-1 and represent the frequency and time indices, respectively, within one SS/PBCH block.

7.4.3.1.3  Mapping of PBCH and DM-RS within an SS/PBCH block

The UE shall assume the sequence of complex-valued symbols $d_{PBCH}(0),...,d_{PBCH}(M_{symb}-1)$ constituting the physical broadcast channel to be scaled by a factor $\beta_{PBCH}$ to conform to the PBCH power allocation specified in [5, TS 38.213] and mapped in sequence starting with $d_{PBCH}(0)$ to resource elements $(k,l)_{p,\mu}$ which meet all the following criteria:

- they are not used for PBCH demodulation reference signals

The mapping to resource elements $(k,l)_{p,\mu}$ not reserved for PBCH DM-RS shall be in increasing order of first the index $k$ and then the index $l$, where $k$ and $l$ represent the frequency and time indices, respectively, within one SS/PBCH block and are given by Table 7.4.3.1-1.

The UE shall assume the sequence of complex-valued symbols $r(0),...r(143)$ constituting the demodulation reference signals for the SS/PBCH block to be scaled by a factor of $\beta_{PBCH}^{DM-RS}$ to conform to the PBCH power allocation specified in [5, TS 38.213] and to be mapped to resource elements $(k,l)_{p,\mu}$ in increasing order of first $k$ and then $l$ where $k$ and $l$ are given by Table 7.4.3.1-1 and represent the frequency and time indices, respectively, within one SS/PBCH block.

7.4.3.2 Time location of an SS/PBCH block

The locations in the time domain where a UE shall monitor for a possible SS/PBCH block are described in clause 4.1 of [5, TS 38.213].

[0039] In [4], description about BWP in TS 38.321 are quoted as below:

5.15 Bandwidth Part (BWP) operation

In addition to clause 12 of TS 38.213 [6], this subclause specifies requirements on BWP operation.

A Serving Cell may be configured with one or multiple BWPs, and the maximum number of BWP per Serving Cell is specified in TS 38.213 [6].

The BWP switching for a Serving Cell is used to activate an inactive BWP and deactivate an active BWP at a time. The BWP switching is controlled by the PDCCH indicating a downlink assignment or an uplink grant, by the *bwp-InactivityTimer*, by RRC signalling, or by the MAC entity itself upon initiation of Random Access procedure. Upon addition of SpCell or activation of an SCell, the DL BWP and UL BWP indicated by *firstActiveDownlinkBWP-Id* and *firstActiveUplinkBWP-Id* respectively (as specified in TS 38.331 [5]) is active without receiving PDCCH indicating a downlink assignment or an uplink grant. The active BWP for a Serving Cell is indicated by either RRC or PDCCH (as specified in TS 38.213 [6]). For unpaired spectrum, a DL BWP is paired with a UL BWP, and BWP switching is common for both UL and DL.

For each activated Serving Cell configured with a BWP, the MAC entity shall:

1> if a BWP is activated:

2> transmit on UL-SCH on the BWP;

2> transmit on RACH on the BWP;

2> monitor the PDCCH on the BWP;

2> transmit PUCCH on the BWP;

2> transmit SRS on the BWP;

2> receive DL-SCH on the BWP;

2> (re-)initialize any suspended configured uplink grants of configured grant Type 1 on the active BWP according to the stored configuration, if any, and to start in the symbol according to rules in subclause 5.8.2.

1> if a BWP is deactivated:

2> not transmit on UL-SCH on the BWP;

2> not transmit on RACH on the BWP;

2> not monitor the PDCCH on the BWP;

2> not transmit PUCCH on the BWP;

2> not report CSI for the BWP;

2> not transmit SRS on the BWP;

2> not receive DL-SCH on the BWP;

2> clear any configured downlink assignment and configured uplink grant of configured grant Type 2 on the BWP;

2> suspend any configured uplink grant of configured grant Type 1 on the inactive BWP.

Upon initiation of the Random Access procedure on a Serving Cell, the MAC entity shall for this Serving Cell:

1> if PRACH occasions are not configured for the active UL BWP:

2> switch the active UL BWP to BWP indicated by *initialUplinkBWP*;

2> if the Serving Cell is a SpCell:

3> switch the active DL BWP to BWP indicated by *initialDownlinkBWP*.

1> else:

2> if the Serving Cell is a SpCell:

3> if the active DL BWP does not have the same *bwp-Id* as the active UL BWP:

4> switch the active DL BWP to the DL BWP with the same *bwp-Id* as the active UL BWP.

1> perform the Random Access procedure on the active DL BWP of SpCell and active UL BWP of this Serving Cell.

If the MAC entity receives a PDCCH for BWP switching of a serving cell, the MAC entity shall:

1> if there is no ongoing Random Access procedure associated with this Serving Cell; or 1> if the ongoing Random Access procedure associated with this Serving Cell is successfully completed upon reception of this PDCCH addressed to C-RNTI (as specified in subclauses 5.1.4 and 5.1.5):

2> perform BWP switching to a BWP indicated by the PDCCH.

If the MAC entity receives a PDCCH for BWP switching for a Serving Cell while a Random Access procedure associated with that Serving Cell is ongoing in the MAC entity, it is up to UE implementation whether to switch BWP or ignore the PDCCH for BWP switching, except for the PDCCH reception for BWP switching addressed to the C-RNTI for successful Random Access procedure completion (as specified in subclauses 5.1.4 and 5.1.5) in which case the UE shall perform BWP switching to a BWP indicated by the PDCCH. Upon reception of the PDCCH for BWP switching other than successful contention resolution, if the MAC entity decides to perform BWP switching, the MAC entity shall stop the ongoing Random Access procedure and initiate a Random Access procedure on the new activated BWP; if the MAC decides to ignore the PDCCH for BWP switching, the MAC entity shall continue with the ongoing Random Access procedure on the active BWP.

If the *bwp-InactivityTimer* is configured, the MAC entity shall for each activated Serving Cell:

1> if the *defaultDownlinkBWP* is configured, and the active DL BWP is not the BWP indicated by the *defaultDownlinkBWP*; or 1> if the *defaultDownlinkBWP* is not configured, and the active DL BWP is not the *initialDownlinkBWP*:

2> if a PDCCH addressed to C-RNTI or CS-RNTI indicating downlink assignment or uplink grant is received on the active BWP; or 2> if a PDCCH addressed to C-RNTI or CS-RNTI indicating downlink assignment or uplink grant is received for the active BWP; or 2> if a MAC PDU is transmitted in a configured uplink grant or received in a configured downlink assignment:

3> if there is no ongoing random access procedure associated with this Serving Cell; or 3> if the ongoing Random Access procedure associated with this Serving Cell is successfully completed upon reception of this PDCCH addressed to C-RNTI (as specified in subclauses 5.1.4 and 5.1.5):

4> start or restart the *bwp-InactivityTimer* associated with the active DL BWP.

2> if a PDCCH for BWP switching is received on the active DL BWP, and the MAC entity switches the active BWP:

3> start or restart the *bwp-InactivityTimer* associated with the active DL BWP.

2> if Random Access procedure is initiated on this Serving Cell:

3> stop the *bwp-InactivityTimer* associated with the active DL BWP of this Serving Cell, if running.

3> if the Serving Cell is SCell:

4> stop the *bwp-InactivityTimer* associated with the active DL BWP of SpCell, if running.

2> if the *bwp-InactivityTimer* associated with the active DL BWP expires:

3> if the *defaultDownlinkBWP* is configured:

4> perform BWP switching to a BWP indicated by the *defaultDownlinkBWP*.

3> else:

4> perform BWP switching to the *initialDownlinkBWP*.

In New Radio (NR), the structure of pathloss estimation, $PL_{b,f,c}(q_d)$, of a PUSCH transmission describes that the UE would use a reference signal in a downlink (DL) BWP, in which the DL BWP is linked to the uplink (UL) BWP contains this PUSCH transmission as mentioned in the background. In the description of the BWP as quoted above, the linking relationship between the DL BWP and the UL BWP only exists in an unpaired spectrum case and a DL BWP is linked to an UL BWP that has the same bwp-id in the same cell in such case. The linking relationship between the DL BWPs and the UL BWPs in the paired spectrum is not determined. Besides, in the description of the reference serving cell in 3GPP TS 38.213 V15.2.0 (2018-6), the UE may be configured by a reference serving cell to estimate the pathloss used for PUSCH transmission on a serving cell. The reference serving cell may be either a primary cell or a Primary SCell (PSCell) which is different from the serving cell where the PUSCH is transmitted. The PSCell could be a primary cell of a secondary cell group (SCG). If a reference serving cell is configured, the reference signal the UE used to estimate pathloss may not be the same cell of a PUSCH transmission. The linking relationship between the UL BWPs and the DL BWPs in different cells is not cleared in NR. The UE is unable to derive pathloss for power control of a PUSCH if a DL BWP is used to perform pathloss estimation is unknown, e.g. which DL BWP on a reference serving is linked to a UL BWP on a different serving cell where the PUSCH is transmitted. Also, it is possible that the UE and base station could not have the same understanding on which the DL BWP is used to perform a measurement. In such case, the estimated pathloss may be inaccurate for compensating the pathloss encounter for PUSCH. For example, a first Reference Signal (RS) in a first DL BWP and a second RS in a second DL BWP may be transmitted by a different base station beam. Also, the UE may use different UE beams to receive/estimate the first RS in the first DL BWP and the second RS in the second DL BWP. Different base station beams and/or different UE beams would result in different channel effect and, as a consequence, misalignment between the calculated transmission power and a power actually required for transmission.

Besides, when the PUSCH power control reference serving cell of a secondary cell is set to a primary cell or a PSCell, the UE has to use the reference signals on the reference serving cell to estimate pathloss. The reference signals for pathloss estimation of a PUSCH could be chosen from the set of PUSCH-PathlossReferenceRS configured to the secondary cell, e.g. if this set is configured and the PUSCH is not msg3. The set of PUSCH-PathlossReferenceRS is configured for each configured UL BWP, e.g. each configured UL BWP could have different PUSCH-PathlossReferenceRS configuration. Alternatively, the set of PUSCH-PathlossReferenceRS for a secondary cell may contain a Channel State Information-Reference Signal (CSI-RS) or Synchronization Signal/Physical Broadcast Channel (SS/PBCH) blocks of the secondary cell, which means that for the set of PUSCH-PathlossReferenceRS of a UL BWP on the secondary cell, this set does not contain any RS of a primary cell or a PSCell. When the Physical Uplink Shared Channel (PUSCH) power control reference serving cell of this secondary cell is set to the primary cell or the PScell, the UE cannot use the RS in this set to estimate pathloss for PUSCH transmission.

In one embodiment, the UE shall use a RS in the active DL BWP of a reference serving cell to estimate the $PL_{b,f,c}(q_d)$ value. In one alternative, an extra set of reference signal indexes may be configured to each UL BWP of each secondary cell to the UE. Compared to the set S0 containing indexes of the reference signals on the secondary cell, the second set S1 contains the indexes of the reference signals on the primary cell or the PScell based on the setting of the reference serving cell in the PUSCH power control. In one alternative, the size of the set S1 may not exceed the value maxNrofPUSCH-PathlossReferenceRSs. Alternatively, next generation Node B (gNB) could configure a parameter N1 to the UE and the size of the set S1 shall not exceed the value N1. Alternatively, the value of N1 may relate to the number of configured DL BWPs of the primary cell or PScell. Alternatively, the size of the set S1 may be the same as the size of the set S0. Alternatively, set S1 may contain CSI-RS resource indexes in the primary cell or PScell. Alternatively, set S1 may contain SS/PBCH block indexes in the primary cell or PScell. When a PUSCH is transmitted on a secondary cell, if the reference serving cell for a PUSCH power control is set to the secondary cell, set S0 is used as the set of PUSCH-PathlossReferenceRS for pathloss estimation. When a PUSCH is transmitted on a secondary cell, if the primary cell or PScell is the reference serving cell for the PUSCH power control, set S1 is used as the set of PUSCH-PathlossReferenceRS for pathloss estimation. Alternatively, the mapping relationship between sri-PUSCH-PowerControlId and PUSCH-PathlossReferenceRS-Id can be different depending on the set of PUSCH-PathlossReferenceRS is S0 or S1. Alternatively, the mapping relationship between sri-PUSCH-PowerControlId and the elements in set S1 can be configure through RRC parameters other than the mapping relationship between sri-PUSCH-PowerControlId and the RS indexes in set S0.

In another embodiment, for a UL BWP of a secondary cell, it is configured as two sets of reference. The first set S0 is the set of PUSCH-pathlossReferenceRS that may contain CSI-RS or SS/PBCH blocks indexes in a secondary cell. Another set S1 contains CSI-RS or SS/PBCH blocks indexes in a primary cell or PScell. The size of these two sets are the same and is bounded by the parameter maxNrofPUSCH-PathlossReferenceRSs. The elements in sets S0 and s1 are both indexed from 0 to maxNrofPUSCH-PathlossReferenceRSs-1. The mapping between the elements in these two sets and sri-PUSCH-PowerControlId is defined through a RRC parameter from gNB. If the reference serving cell for PUSCH power control is set to a secondary cell, set S0 is used to determine the RS for pathloss estimation. Alternatively, if the reference serving cell is set to a primary cell or PScell, the UE would use reference signal indexes in S1 to estimate of the value $PL_{b,f,c}(q_d)$. If parameter SRI-PUSCH-PowerControl is provided to the UE, the UE would be configured to a mapping relationship between the values of sri-PUSCHPowerControlId and the elements of S1, additionally. If the Downlink Control Information (DCI) indicating PUSCH transmission contains a Service Request Indicator (SRI) field, the UE would use the value of the SRI field and the mapping relationship between the SRI field and the elements of set S1 to determine the RS $q_d$ used to estimate pathloss. Alternatively, if the DCI does not contain the SRI field and the spatial setting for PUCCH transmission is not provided, the UE determines the RS $q_d$ from the set S1 with the element indexed to zero.

In another embodiment, the set of PUSCH-pathlossreferenceRS configured to a secondary cell shall contain at least one reference signal index that the RS is transmitted on the primary cell or PScell based on the setting of the reference serving cell of the PUSCH power control. Alternatively, the reference signal may be a CSI-RS in a primary cell or PScell. Alternatively, the reference signal may be SS/PBCH blocks in a primary cell or PScell. When the UE transmits a PUSCH on a secondary cell and the PUSCH pathloss reference serving cell is a primary cell or PScell, the UE shall use the reference signals on the primary cell or PScell from the set of PUSCH-pathlossreferenceRS to estimate pathloss. Alternatively, if the DCI does not contain a SRI field and a spatial setting for PUCCH transmission is not provided, the UE determines the RS from the set of PUSCH-pathlossreferenceRS with the element having the lowest index in the active DL BWP in a primary cell or PScell. Alternatively, if the DCI contains a SRI field to indicate the pathloss RS, the UE expects that the SRI field in the DCI would indicate the reference signals on the active DL BWP of the primary cell or PScell. Alternatively, if the reference serving cell is a primary cell or PS cell and index $q_d$ is mapped to a reference signal in a secondary cell, the UE would use the RS resource from the SS/PBCH block index that the UE obtains from the higher layer parameter MasterInformationBlock to estimate pathloss. Alternatively, if the reference serving cell is a primary cell or PScell and index $q_d$ is mapped to a reference signal in a secondary cell, the UE would use the RS resource in the active DL BWP of the primary cell or PScell with the lowest index in the set of PUSCH-pathlossreferenceRS to estimate pathloss.

Another embodiment is directed to determining the DL BWPs in the reference serving cell for the PUSCH power control of each UL BWP. A mapping relationship between the UL BWPs of a cell and the DL BWPs of the possible reference serving cells are determined for pathloss estimation. When the UE transmits a PUSCH on a UL BWP of a cell, the pathloss estimation of the PUSCH power control is calculated through a RS on the DL BWP in a reference serving cell having a mapping relationship to this UL BWP. For PUSCH power control, the mapping relationship shall also be indicated in the UL BWPs of the secondary cell and the DL BWPs of the corresponding PScell based on the setting of the reference serving cell.

Another embodiment is directed to a mapping relationship of a UL BWP being used to determine the DL BWP in a reference serving cell for the PUSCH power control. In one alternative, the mapping relationship could be indicated though RRC parameters. Alternatively, a pre-determined rule known by both the UE and the gNB could be used to determine the mapping relationship. In one embodiment, this pre-determined rule may be the UL BWP is mapped to a DL BWP with the nearest bwp-id. In another embodiment, this pre-determined rule may relate to the bwp-id of UL BWP in the cell, $U_{id}$, the number of UL BWP in the cell, $N_u$, and the number of DL BWPs in the reference serving cell, $N_d$. For the UL BWPs of the PScell, the mapping relationship is determined between the UL BWPs and the DL BWPS of one cell. For the UL BWPs of a secondary cell, the mapping relationship to the DL BWPs of the same cell, and the mapping relationship to the DL BWPs of the PScell shall both be determined for the PUSCH power control. The UE would use a RS on the DL BWP of the reference serving cell having a mapping relationship with the UL BWP containing the PUSCH transmission to calculate the pathloss estimation. Alternatively, multiple UL BWPs in one cell may map to one DL BWP of a cell. Alternatively, if a mapping relationship is not provided, a UL BWP may use a DL BWP with the nearest bwp-id in a cell for PUSCH power control. Alternatively, if a mapping relationship is not provided, a UL BWP may use an active DL BWP in the reference serving cell for PUSCH power control. Alternatively, if a mapping relationship is not provided, a UL BWP may use a DL BWP with bwp-id zero in a reference serving cell for the PUSCH power control. In one embodiment, the number of UL BWPs of a cell shall not be greater than the number of DL BWPs of its reference serving cell. In one embodiment, when the active UL BWP switches in one cell, the corresponding reference serving cell shall switch its active DL BWP to a BWP linking with a new active UL BWP. Alternatively, a UL BWP of a cell shall link to one and only one DL BWP of each possible reference serving cell. In another alternative, a UL BWP of a cell shall link to one or more than one DL BWPs of each possible reference serving cell.

Any of the above-disclosed methods to determine mapping relationship could be combined to determine the DL BWP for a PUSCH power control. In one embodiment, for a secondary cell, the mapping relationship of the UL BWPs of the secondary cell shall be determined for the DL BWPs of this secondary cell and the DL BWPs of the primary cell or PScell. The mapping between the DL and UL BWPs of the secondary cell may follow that the UL BWP maps to a DL BWP with the nearest bwp-id. Assuming this secondary cell is configured with four UL BWPs and three DL BWPs, the mapping relationship would be UL BWP 0 maps to DL BWP 0, UL BWP 1 maps to DL BWP 1, UL BWP 2 maps to DL BWP 2 and UL BWP 3 maps to DL BWP 2. For the linking relationship between the UL BWPs of the secondary cell and the DL BWPs of the primary cell or PScell, the mapping relationship is indicated through the RRC parameters configured to each UL BWP. Assuming the corresponding primary cell or PScell is configured with three DL BWPs, the linking relationship could be UL BWP 0 maps to DL BWP 1, UL BWP 1 maps to DL BWP 1, UL BWP 2 maps to DL BWP 0 and UL BWP 3 maps to DL BWP 0 configured by the RRC parameters to each UL BWP.

In one embodiment of a UE and a gNB using a predetermined rule to determine the mapping relationship of the UL BWPs of a cell and the DL BWPs of the possible reference serving cells is disclosed as follows. The rule is that a UL BWP with a bwp-id $U_{id}$ is mapped to a DL BWP in the reference serving cell with a bwp-id=$[(U_{id}) \bmod N_d]$, where $N_d$ is the number of configured DL BWPs in the reference serving cell. For a PUSCH is transmitted on a secondary cell, the reference serving cell is configured to the same cell of the PUSCH transmission. Assuming this cell is configured with four UL BWPs and 2 DL BWPs, and based on the pre-determined rule, the mapping relationship is UL BWP 0 maps to DL BWP 0, UL BWP 1 maps to DL BWP 1, UL BWP 2 maps to DL BWP 0 and UL BWP 3 maps to DL BWP 1. If the reference serving cell is configured to the primary cell or PScell, assuming there are three DL BWPs in reference cell, the mapping relationship is UL BWP 0 maps to DL BWP 0, UL BWP 1 maps to DL BWP 1, UL BWP 2 maps to DL BWP 2 and UL BWP 3 maps to DL BWP 0.

In another embodiment of a UE and a gNB using a predetermined rule to determine the mapping relationship of the UL BWPs of a cell and the DL BWPs of the possible reference serving cells is disclosed as follow. The rule is that a UL BWP with a bwp-id $U_{id}$ is mapped to a DL BWP in the reference serving cell with bwp-id=$\lfloor (U_{id}*N_d)/N_u \rfloor$, where $\lfloor x \rfloor$ represents floor function of x, $N_d$ is the number of configured DL BWPs in the reference serving cell and $N_u$ is the number of configured UL BWPs of this cell. For a PUSCH is transmitted on a secondary cell, the reference serving cell is configured to the same cell of PUSCH transmission. Assuming this cell is configured with four UL BWPs and 2 DL BWPs and based on the pre-determined rule, the mapping relationship is UL BWP 0 maps to DL BWP 0, UL BWP 1 maps to DL BWP 1, UL BWP 2 maps to DL BWP 0 and UL BWP 3 maps to DL BWP 1. When the reference serving cell is configured to the primary cell or PScell, assuming there are three DL BWPs in reference cell, the mapping relationship is UL BWP 0 maps to DL BWP 0, UL BWP 1 maps to DL BWP 1, UL BWP 2 maps to DL BWP 2 and UL BWP 3 maps to DL BWP 0.

Another issue is the reference signal used to estimate pathloss may not be in the active DL BWP in the reference serving cell for the PUSCH power control. In one embodiment, when the UE is configured a PUSCH through DCI format 0_0 and the UE is not configured with the spatial setting of the PUCCH transmission, the UE would use the RS indexed to zero in the set of PUSCH-pathlossreferenceRS to estimate the pathloss. The reference signal indexed to zero may be not in the active DL BWP. This may confuse the UE to estimate pathloss for the PUSCH transmission. This issue may also happen in case where the PUSCH is transmitted on a secondary cell and the reference serving cell for the PUSCH power control is the primary cell or PScell.

In one embodiment, it is ensured that at least one RS in the set of PUSCH-pathlossreferenceRS is in the active DL BWP of the reference serving cell. When the gNB configures the indexes in the set of PUSCH-pathlossreferenceRS, each configured DL BWP of the reference serving cell for the PUSCH power control shall contain at least one RS in this set. In another embodiment, when the RS for the PUSCH pathloss estimation is determined through the SRI filed in DCI format 0_1, the gNB shall configure the RS in the active DL BWP in the reference serving cell. Alternatively, when the PUSCH transmission is scheduled by a DCI format 0_0 and if the UE is not provided a spatial setting for a PUCCH transmission, or by a DCI format 0_1 that does not include a SRI field, or if a higher layer parameter SRI-PathlossReferenceIndex-Mapping is not provided to the UE, the UE determines a RS resource in the active DL BWP of the reference serving cell with the lowest pusch-pathlossreference-index value. Alternatively, when a PUSCH transmission is configured by a higher layer parameter, ConfiguredGrantConfig, that does not include a parameter pathlossReferenceIndex, and the DCI format activating the PUSCH transmission does not include a SRI field, the UE determines a RS resource in the active DL BWP of the reference serving cell with lowest PUSCH-PathlossReferenceRS-Id value.

In another embodiment, the gNB has to configure at least one RS that corresponds to each configured DL BWP of the cell in the set of PUSCH-pathlossreferenceRS. For example, assuming a cell is configured with three downlink BWP including an initial active DL BWP indexed with DL BWP 0, DL BWP 1 and DL BWP 2, the set of PUSCH-pathlossreferenceRS is configured to each UL BWP in this cell and the cell shall contain at least one RS in DL BWP 0, one RS in DL BWP 1 and one RS in DL BWP 2.

When the cell is a secondary cell, two sets, S0 containing RS in secondary cell and S1 containing RS in the Primary cell or PScell, may be both configured. In one embodiment, the RS in these two set can be CSI-RS or SS/PBCH blocks. For each configured DL BWP to the secondary cell, at least one RS on this DL BWP is indexed in set S0. And for each configured DL BWP to the primary cell or PScell, at least one RS on this DL BWP is indexed in set S1.

The above-disclosed embodiments could be combined to determine the RS for pathloss estimation in PUSCH power control.

According to one method of a UE and gNB, the method includes the downlink path-loss estimate for PUSCH power control using a reference signal (RS) index for the active DL BWP of the reference serving cell.

In another method, for each configured UL BWP of each secondary cell, two sets, S0 and S1, are configured.

In another method, set S0 contains the RS resource indexes of SS/PBCH blocks or CSI-RS indexes of the secondary cell.

In another method, for set S0, at least one RS of each DL BWP configured to the secondary cell is included in the set.

In another method, set S1 contains RS resource indexes of SS/PBCH blocks or CSI-RS indexes of the PScell corresponds to the setting of the reference serving cell in PUSCH power control of a secondary cell.

In another method, for set S1, at least one RS of each DL BWP configured to the PScell is included in the set.

In another method, the size of S0 and S1 is bounded by gNB configured parameter(s).

In another method, the size of S0 and S1 is the same

In another method, the size of S0 and S1 is determined based on the number of configured DL BWP of the corresponding cell.

In another method, the elements in set S0 are indexed from 0 to N0-1, where N0 is the maximum size of set S0

In another method, the elements in set S1 are indexed from 0 to N1-1, where N1 is the maximum size of set S1.

In another method, when the reference serving cell for PUSCH power control for the secondary cell is configured to the secondary cell, set S0 is used as the set to determine $q_d$ for pathloss estimation.

In another method, when the reference serving cell for PUSCH power control for the secondary cell is configured to the PScell, set S1 is used as the set to determine $q_d$ for pathloss estimation.

In another method, the mapping relationship between PUSCH-PathlossReferenceRS-Id and sri-PUSCHPowerControlId is different based on whether S0 or S1 is used.

In another method, the mapping relationship between PUSCH-PathlossReferenceRS-Id of S0 and sri-PUSCHPowerControlId is configured by gNB.

In another method, the mapping relationship between PUSCH-PathlossReferenceRS-Id of S1 and sri-PUSCHPowerControlId is configured by gNB According to one method of a UE an gNB, the method includes defining a mapping relationship between the UL BWPs of a cell and the DL BWPs of each possible reference serving cell for PUSCH power control. When the UE transmits a PUSCH on a UL BWP of a cell, the pathloss estimation of the PUSCH power control is calculated through a RS on the DL BWP in the reference serving cell having mapping relationship to this UL BWP.

In another method, the mapping relationship is indicated through RRC parameters.

In another method, the mapping relationship is determined through a pre-determined rule known by both the UE and gNB In another method, this predetermined rule relates to the bwp-id of the UL BWP in the cell, $U_{id}$, the number of the UL BWP in the cell, $N_u$, and the number of the DL BWPs in the reference serving cell, $N_d$.

In another method, the predetermined rule is a UL BWP with bwp-id $U_{id}$ mapping to a DL BWP of the corresponding reference serving cell with the nearest bwp-id.

In another method, the predetermined rule is a UL BWP with bwp-id $U_{id}$ mapping to a DL BWP of the corresponding reference serving cell with bwp-id=$[(U_{id}+C) \bmod N_d]$, where C is a integer.

In another method, the predetermined rule is a UL BWP with bwp-id $U_{id}$ mapping to a DL BWP of the corresponding reference serving cell with bwp-id=$\lfloor (U_{id}*N_d)/N \rfloor$, where $\lfloor x \rfloor$ represents the floor function of x.

In another method, the number of UL BWPs of a cell is not greater than the number of DL BWPs of the corresponding reference serving cell.

In another method, multiple UL BWPs of a cell could map to the same DL BWP of a cell.

In another method, a UL BWP maps to one and only one DL BWP of each possible reference serving cell.

In another method, a UL BWP maps to one or more DL BWP of each possible reference serving cell.

In another method, when the active UL BWP switches on a cell, the corresponding reference serving cell for PUSCH power control shall switch its active DL BWP to a DL BWP having a mapping relationship with the new UL BWP.

In another method, when the active UL BWP switches on a cell, the corresponding reference serving cell for PUSCH power control shall switch its active DL BWP to a DL BWP having a mapping relationship with the new UL BWP.

In another method, if the mapping relationship is not provided to a UL BWP, the pathloss is calculated through a RS in a DL BWP with the nearest bwp-id of the reference serving cell.

In another method, if the mapping relationship is not provided to a UL BWP, the pathloss is calculated through a RS in an active DL BWP of the reference serving cell.

In another method, if the mapping relationship is not provided to a UL BWP, the pathloss is calculated through a RS in a DL BWP with bwp-id zero of the reference serving cell.

In another method, the set of the RS resources indexes for pathloss estimation contains at least one RS of each possible reference serving cell.

In another method, the set of RS resources indexes for pathloss estimation contains at least one RS of each configured DL BWP of each possible reference serving cell.

In another method, when the RS used for pathloss estimation is configured through a SRI field in DCI format 0_1, gNB does not indicate a RS which is not in the active downlink BWP of reference serving cell.

In another method, when the RS configured through a SRI field in a DCI format 0_1 is not in the reference serving cell, the UE do not use the RS to estimate pathloss.

In another method, when the PUSCH transmission is scheduled by a DCI format 0_0 and if the UE is not provided a spatial setting for a PUCCH transmission, or by a DCI format 0_1 that does not include a SRI field, or if a higher layer parameter SRI-PathlossReferenceIndex-Mapping is not provided to the UE, the UE determines a RS resource in the active DL BWP of the reference serving cell with the lowest pusch-pathlossreference-index value.

In another method, when a PUSCH transmission configured by a higher layer parameter ConfiguredGrantConfig does not include a parameter pathlossReferenceIndex, and the DCI format activating the PUSCH transmission does not include a SRI field, the UE determines a RS resource in the active DL BWP of the reference serving cell with the lowest PUSCH-PathlossReferenceRS-Id value.

In another method, if the UE cannot use a RS in an active DL BWP of the reference serving cell for the PUSCH power control to estimate pathloss, the UE estimates (or derives) the pathloss using a RS resource from the SS/PBCH block index that the UE obtains higher layer parameter MasterInformationBlock.

Figure 11:
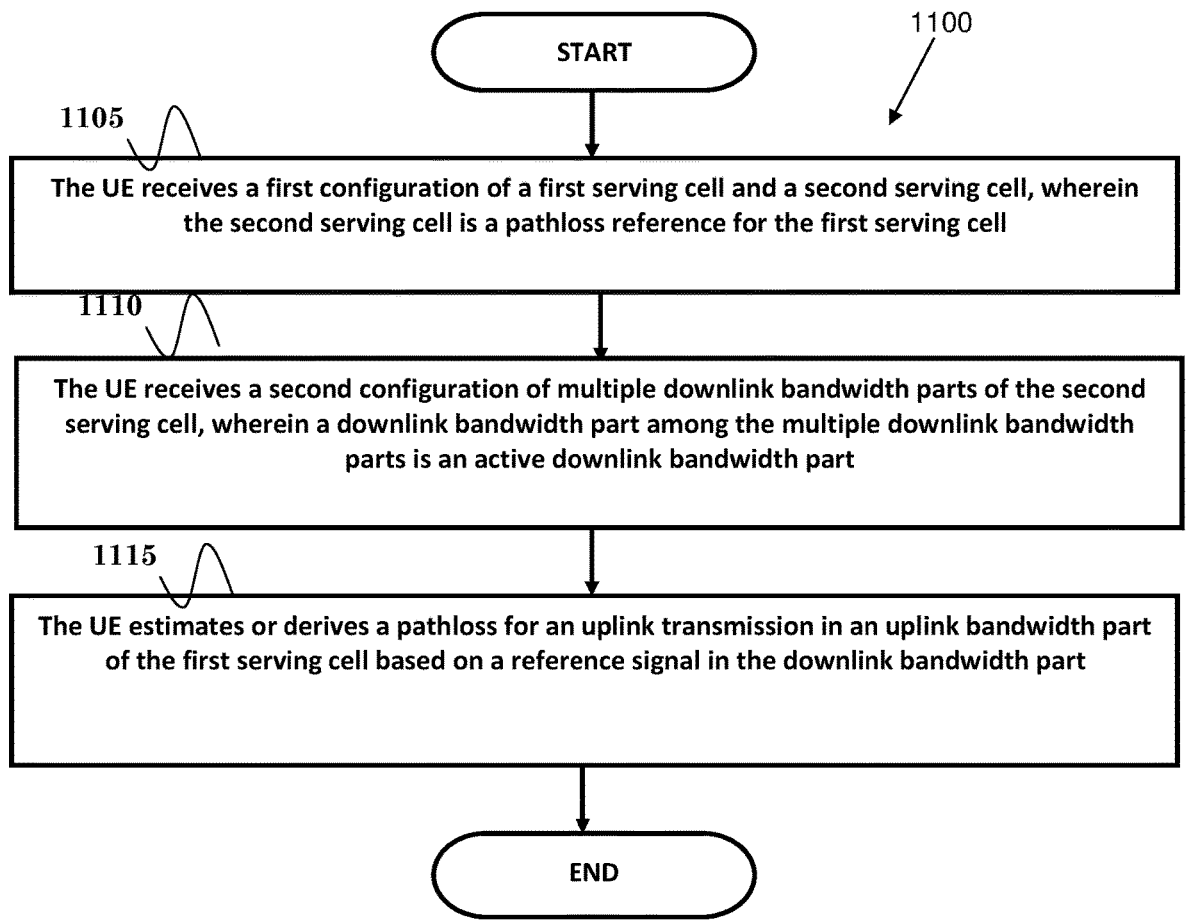
FIG. 11 is a flow diagram for one exemplary embodiment from the perspective of a User Equipment (UE).

FIG. 11 is a flow chart 1100 according to one exemplary embodiment from the perspective of a UE. In step 1105, a UE receives a first configuration of a first serving cell and a second serving cell, wherein the second serving cell is a pathloss reference for the first serving cell. In step 1110, the UE receives a second configuration of multiple downlink bandwidth parts of the second serving cell, wherein a downlink bandwidth part among the multiple downlink bandwidth parts is an active downlink bandwidth part. In step 1115, the UE estimates (or derives) a pathloss for an uplink transmission in an uplink bandwidth part of the first serving cell based on a reference signal in the downlink bandwidth part.

In another method, the downlink bandwidth part is not linked with the uplink bandwidth part.

In another method, the downlink bandwidth part and the uplink bandwidth part have different bandwidth part indices.

In another method, the bandwidth part indices are identifiers for the bandwidth parts provided by configurations of bwp-Id.

In another method, the downlink bandwidth part and the uplink bandwidth part have different center frequencies.

In another method, a number of the uplink bandwidth parts configured on the first serving cell is different from a number of the multiple downlink bandwidth parts of the second serving cell.

In another method, the pathloss reference is indicated by a parameter pathlossReferenceLinking.

Figure 12:
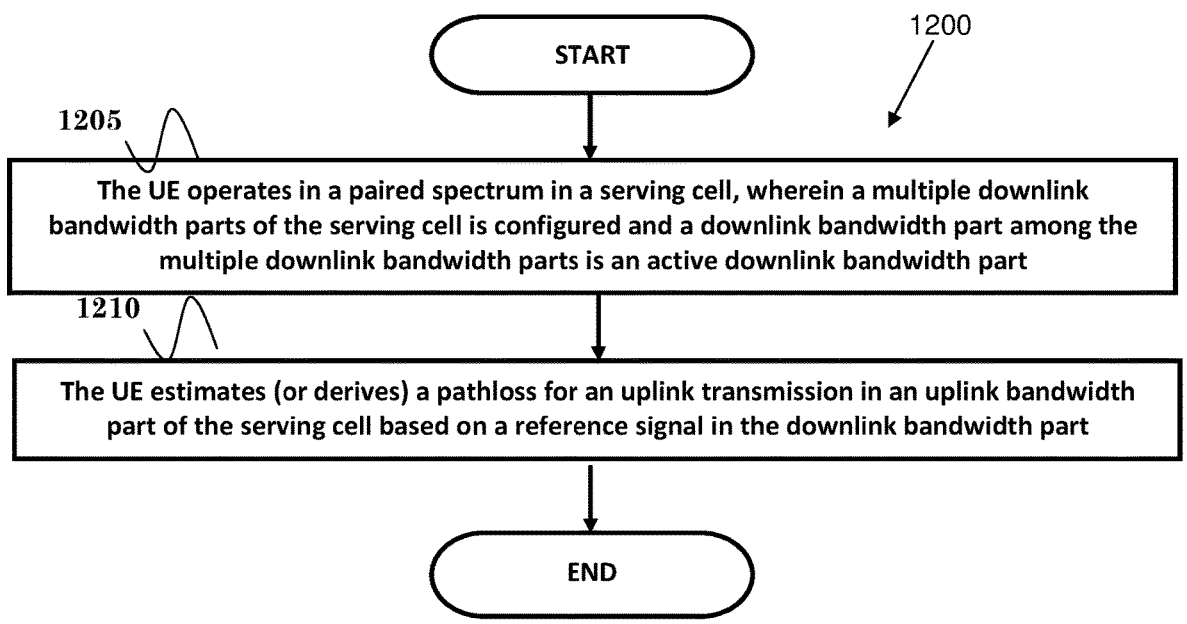
FIG. 12 is a flow diagram for one exemplary embodiment from the perspective of a network.

FIG. 12 is a flow chart 1200 according to one exemplary embodiment from the perspective of a UE. In step 1205, a UE operates in a paired spectrum in a serving cell, wherein a multiple downlink bandwidth parts of the serving cell is configured and a downlink bandwidth part among the multiple downlink bandwidth parts is an active downlink bandwidth part. In step 1210, the UE estimates (or derives) a pathloss for an uplink transmission in an uplink bandwidth part of the serving cell based on a reference signal in the downlink bandwidth part.

In another method, the downlink bandwidth part is not linked with the uplink bandwidth part.

In another method, the downlink bandwidth part and the uplink bandwidth part have different bandwidth part indices.

In another method, the bandwidth part indices are identifiers for the bandwidth parts provided by configurations of bwp-Id.

In another method, the downlink bandwidth part and the uplink bandwidth part have different center frequencies.

In another method, a number of the uplink bandwidth part configured on the serving cell is different from a number of the downlink bandwidth parts of the serving cell.

As those skilled in the art will appreciate, the various disclosed embodiments may be combined to form new embodiments and/or methods.

Referring back to FIGS. 3 and 4, in one embodiment, the device 300 includes a program code 312 stored in memory 310. The CPU 308 could execute program code 312 to (i) receive a first configuration of a first serving cell and a second serving cell, wherein the second serving cell is a pathloss reference for the first serving cell, (ii) receive a second configuration of multiple downlink bandwidth parts of the second serving cell, wherein a downlink bandwidth part among the multiple downlink bandwidth parts is an active downlink bandwidth part, and (iii) estimate (or derive) a pathloss for an uplink transmission in an uplink bandwidth part of the first serving cell based on a reference signal in the downlink bandwidth part.

In another embodiment, the device includes a program code 312 stored in the memory 310. The CPU 308 could execute program code 312 to (i) operate in a paired spectrum in a serving cell, wherein a multiple downlink bandwidth parts of the serving cell is configured and a downlink bandwidth part among the multiple downlink bandwidth parts is an active downlink bandwidth part, and (ii) estimate (or derive) a pathloss for an uplink transmission in an uplink bandwidth part of the serving cell based on a reference signal in the downlink bandwidth part.

Furthermore, the CPU 308 can execute the program code 312 to perform all of the above-described actions and steps or others methods described herein.

The above-disclosed methods address the problem of PUSCH being transmitted on a secondary cell but references the serving cell for PUSCH power control is a primary cell or PScell. The above-disclosed methods address the problem that the RS chosen for pathloss estimation is not in the active DL BWP of the reference serving cell.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of a User Equipment (UE), the method comprising:

receiving a first configuration of a first serving cell and a second serving cell, wherein the first serving cell is configured with pathlossReferenceLinking parameter;

receiving a second configuration of multiple downlink bandwidth parts of the second serving cell, wherein a downlink bandwidth part among the multiple downlink bandwidth parts is an active downlink bandwidth part that is activated by a downlink control information (DCI) indicating a bandwidth part switch; and estimating or deriving a pathloss for an uplink transmission in an uplink bandwidth part of the first serving cell based solely on a reference signal in the active downlink bandwidth part only, wherein the active downlink bandwidth part is not linked with the uplink bandwidth part.

2. The method of claim 1, wherein the active downlink bandwidth part and the uplink bandwidth part have different bandwidth part indices.

3. The method of claim 1, wherein the bandwidth part indices are identifiers for the bandwidth parts provided by configurations of bwp-Id.

4. The method of claim 1, wherein the active downlink bandwidth part and the uplink bandwidth part have different center frequencies.

5. The method of claim 1, wherein a number of the uplink bandwidth parts configured on the first serving cell is different from a number of the multiple downlink bandwidth parts of the second serving cell.

6. The method of claim 1, wherein the UE uses the reference signal in the active downlink bandwidth part to derive a decibel value using reference signal index $q_d$.

7. The method of claim 1, wherein the second serving cell is a pathloss reference for the first serving cell.

8. A method of a User Equipment (UE), the method comprising:

operating in a paired spectrum in a serving cell, wherein a multiple downlink bandwidth parts of the serving cell is configured and a downlink bandwidth part among the multiple downlink bandwidth parts is an active downlink bandwidth part that is activated by a downlink control information (DCI) indicating a bandwidth part switch; and estimating or deriving a pathloss for an uplink transmission in an uplink bandwidth part of the serving cell based solely on a reference signal in the active downlink bandwidth part only, wherein the active downlink bandwidth part does not correspond to the uplink bandwidth part.

9. The method of claim 8, wherein the active downlink bandwidth part and the uplink bandwidth part have different bandwidth part indices.

10. The method of claim 8, wherein the bandwidth part indices are identifiers for the bandwidth parts provided by configurations of bwp-Id.

11. The method of claim 8, wherein the active downlink bandwidth part and the uplink bandwidth part have different center frequencies.

12. The method of claim 8, wherein a number of the uplink bandwidth part configured on the serving cell is different from a number of the downlink bandwidth parts of the serving cell.

13. The method of claim 8, wherein the UE uses the reference signal in the active downlink bandwidth part to derive a decibel value using reference signal index $q_d$.

14. A User Equipment (UE), comprising:
a processor; and
a memory operatively coupled to the processor, wherein the processor is configured to execute a program code to:

receive a first configuration of a first serving cell and a second serving cell, wherein the first serving cell is configured with a pathlossReferenceLinking parameter;

receive a second configuration of multiple downlink bandwidth parts of the second serving cell, wherein a downlink bandwidth part among the multiple downlink bandwidth parts is an active downlink bandwidth part that is activated by a downlink control information (DCI) indicating a bandwidth part switch; and estimate or derive a pathloss for an uplink transmission in an uplink bandwidth part of the first serving cell based solely on a reference signal in the active downlink bandwidth part only, wherein the active downlink bandwidth part is not linked with the uplink bandwidth part.

15. The UE of claim 14, wherein the active downlink bandwidth part and the uplink bandwidth part have different bandwidth part indices.

16. The UE of claim 14, wherein the bandwidth part indices are identifiers for the bandwidth parts provided by configurations of bwp-Id.

17. The UE of claim 14, wherein the active downlink bandwidth part and the uplink bandwidth part have different center frequencies.

18. The UE of claim 14, wherein a number of the uplink bandwidth parts configured on the first serving cell is different from a number of the multiple downlink bandwidth parts of the second serving cell.

19. The UE of claim 14, wherein the processor is further configured to execute the program code to:
use the reference signal in the active downlink bandwidth part to derive a decibel value using reference signal index $q_d$.

20. The method of claim 14, wherein the second serving cell is a pathloss reference for the first serving cell.

* * * * *